United States Patent
Dong et al.

(10) Patent No.: US 11,471,982 B2
(45) Date of Patent: Oct. 18, 2022

(54) UNIFIED FATIGUE LIFE EVALUATION METHOD FOR WELDED STRUCTURES

(71) Applicant: The Regents of The University of Michigan, Ann Arbor, MI (US)

(72) Inventors: Pingsha Dong, Ann Arbor, MI (US); Xianjun Pei, Ann Arbor, MI (US); Jifa Mei, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 854 days.

(21) Appl. No.: 16/055,485

(22) Filed: Aug. 6, 2018

(65) Prior Publication Data
US 2019/0054573 A1    Feb. 21, 2019

Related U.S. Application Data

(60) Provisional application No. 62/547,343, filed on Aug. 18, 2017.

(51) Int. Cl.
*B23K 31/02*    (2006.01)
*B23K 31/12*    (2006.01)
(Continued)

(52) U.S. Cl.
CPC .............. *B23K 31/02* (2013.01); *B23K 31/12* (2013.01); *G01M 5/0041* (2013.01);
(Continued)

(58) Field of Classification Search
CPC ......... B23K 31/02; B23K 31/12; G06F 30/23; G06F 2119/04; G01M 5/0041;
(Continued)

(56) References Cited

U.S. PATENT DOCUMENTS 6,901,809 B2 *  6/2005  Dong ..................... G06F 30/23
                                                73/789
7,440,879 B2 * 10/2008  Breitfeld ................ G06F 30/23
                                                703/6
(Continued)

FOREIGN PATENT DOCUMENTS

JP    2010156668 A  *  7/2010
JP    2013057646 A  *  3/2013

OTHER PUBLICATIONS

Dong, P., Pei, X., Xing, S., Kim, M. H., A structural strain method for low-cycle fatigue evaluation of welded components, 2014, International Journal of Pressure Vessels and Piping, vol. 119, pp. 39-51 (Year: 2014).*

(Continued)

*Primary Examiner* — Bijan Mapar
(74) *Attorney, Agent, or Firm* — Harness, Dickey & Pierce, P.L.C.

(57) ABSTRACT

Due to geometric discontinuities introduced by welding and joining processes, stresses or strain cannot be calculated reliably calculated using modern analytical and computer methods as result of stress or strain singularity at joint locations, which leads to severe mesh sensitivity. Design and fatigue evaluation of these structures remain empirical. This disclosure addresses mesh insensitivity of stress/strain calculations for welded structures through a cut-plane traction stress method through a novel post processing of conventional finite element computation results, as well as provides a unified fatigue evaluation procedure for fatigue design and structural life evaluation for both low-cycle and high cycle fatigue regime subjected to either proportional or non-proportional multiaxial fatigue loading, as well as a simple and reliable method for treating spot welds.

6 Claims, 26 Drawing Sheets

(51) Int. Cl.
  *G06F 30/23* (2020.01)
  *G01M 5/00* (2006.01)
  *G06F 119/04* (2020.01)
(52) U.S. Cl.
  CPC ..... *G06F 30/23* (2020.01); *G01N 2203/0073* (2013.01); *G01N 2203/0214* (2013.01); *G01N 2203/0216* (2013.01); *G06F 2119/04* (2020.01)
(58) Field of Classification Search
  CPC ... G01N 2203/0073; G01N 2203/0214; G01N 2203/0216
  See application file for complete search history.

(56) References Cited

U.S. PATENT DOCUMENTS

| | | | |
|---|---|---|---|
| 7,516,673 B2 | 4/2009 | Dong et al. | |
| 7,752,917 B2* | 7/2010 | Tomioka | G06F 30/23 73/841 |
| 8,649,985 B2* | 2/2014 | Dong | G06F 30/20 702/34 |
| 2005/0171745 A1 | 8/2005 | Breitfeld et al. | |
| 2009/0211366 A1 | 8/2009 | Tomioka | |
| 2012/0259593 A1* | 10/2012 | El-Zein | G06F 30/23 703/1 |
| 2012/0271566 A1 | 10/2012 | Deshmukh et al. | |
| 2015/0213164 A1 | 7/2015 | Wang et al. | |

OTHER PUBLICATIONS

Kang, H. T., Dong, P., Hong, J. K., Fatigue analysis of spot welds using a mesh-insensitive structural stress approach, 2007, International Journal of Fatigue, vol. 29, pp. 1546-1553 (Year: 2007).*

Mei, J., Dong, P., A new path-dependent fatigue damage model for non-proportional multi-axial loading, 2016, International Journal of Fatigue, vol. 90, pp. 210-221 (Year: 2016).*

Zemlyanova, A. Y., & Walton, J. R. (2012). Modeling of a curvilinear planar crack with a curvature-dependent surface tension. SIAM Journal on Applied Mathematics, 72(5), 1474-1492. (Year: 2012).*

P. Dong et al "A Path-Dependent Cycle Counting Method For Variable-Amplitude Multi-Axial Loading", International Journal of Fatigue 32, pp. 720,723 (2010).

Anonymous: Wikipedia, Fatigue (material)—1-9, Aug. 14, 2017 (Aug. 14, 2017), pp. 1-15, XP055818905, Retrieved from the Internet: URL:https://en.wikipedia.0rg/w/index.php?title=Fatigue_(material)&oldid=795474903 [retrieved on Jun. 28, 2021].

Marin T. et al: "Fatigue design of welded joints using the finite element method and the 2007 ASME Div. 2 Master curve", Frattura Ed Integritá Strutturale, vol. 3, No. 9, Jul. 1, 2009 (Jul. 1, 2009), pp. 76-84, XP055818851, DOI: 10.3221/IGF-ESIS.09.08.

* cited by examiner

Section A-A-C-C in a 3D Cross-Section

UNIFIED FATIGUE LIFE EVALUATION METHOD FOR WELDED STRUCTURES

CROSS-REFERENCE TO RELATED APPLICATIONS

This application claims the benefit of U.S. Provisional Application No. 62/547,343, filed on Aug. 18, 2017. The entire disclosure of the above application is incorporated herein by reference.

FIELD

The present disclosure relates to a unified fatigue life evaluation method for welded joints and other structures.

BACKGROUND

Engineering structures subject to time-varying loads are prone to fatigue damage and failure. These include automotive, earthmoving equipment, pressure vessels and piping, aircrafts, ship and offshore structures, etc. Welding has been a major manufacturing process in construction of these structures. Due to geometric discontinuities introduced by welding and joining processes, stresses or strain cannot be calculated reliably using modern analytical and computer methods as a result of stress or strain singularity at joint locations. Design and fatigue evaluation of these structure remain empirical to this date. This disclosure not only addresses mesh-insensitivity of stress/strain calculation for welded structures through a cut-plane traction stress method through a novel post-processing of conventional finite element computational results, but also provides a unified fatigue evaluation procedure for fatigue design and structural life evaluation for structures through an integrated treatment.

This section provides background information related to the present disclosure which is not necessarily prior art.

SUMMARY

This section provides a general summary of the disclosure, and is not a comprehensive disclosure of its full scope or all of its features.

A unified method is presented for estimating fatigue for a welded structure under load. The method includes: generating a finite element model for a given structure; calculating a distribution of structural stress within the given structure using the finite element model and while the given structure is under a given load, where the distribution of stress is determined in relation to a plane intersecting the given structure; determining whether stress exceeds yield strength of material comprising the given structure; calculating a distribution of structural strain experienced within the given structure using Hooks law in response to a determination that the stress is less than yield strength of material; calculating a distribution of structural strain experienced within the given structure using an analytic method in response to a determination that the stress exceeds yield strength of material, where the distribution of structural strain is calculated in part from the calculated distribution of structural stress and the distribution of structural strain is defined in relation to the plane by at least two closed-form expressions which account for stress that exceeds yield strength of material; and calculating a fatigue life for the given structure when placed under the given load using the calculated distribution of structural strain using a master E-N curve.

In one embodiment, a type of weld for the given structure is identified and a distribution of stress is calculated in accordance with the identified type of weld.

For a linear type of weld, a distribution of structural stress within the given structure is calculated by identifying weld line positions in terms of finite element nodes in the finite element model and elements contributing nodal forces; transforming nodal forces and moments into line forces and line moments, respectively; and calculating structural stresses at each nodal position along the weld line by dividing line force by plate thickness and line moment by section modulus.

For a spot type of weld, a distribution of structural stress within the given structure is calculated by modeling a spot weld as a beam coupled between two or more plates; defining a square area that encapsulates the spot weld; extracting nodal forces and moments with respect to edges of the square area from the finite element model; and calculating structural stresses for the spot weld from the computed nodal forces and moments using a superposition method.

In some embodiments, a determination is made as to whether the given structure is subject to non-proportional multiaxial load condition. When the given structure is not subject to non-proportional multiaxial load condition, a structural strain range is calculated using Rainflow cycle counting. On the other hand, when the given structure is subject to non-proportional multiaxial load condition, a structural strain range is calculated as a function of the non-proportional damage parameter which accounts for non-proportional loading effects between normal and in-plane shear stresses. For example, the structural strain range is calculated by representing a non-proportional load path in a piecewise linear form; computing a non-proportional damage parameter by numerically integrating the moment of each linear segment of the piecewise linear form with respect to a reference load path; and calculating the structural strain range as a function of the non-proportional damage parameter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 10A:
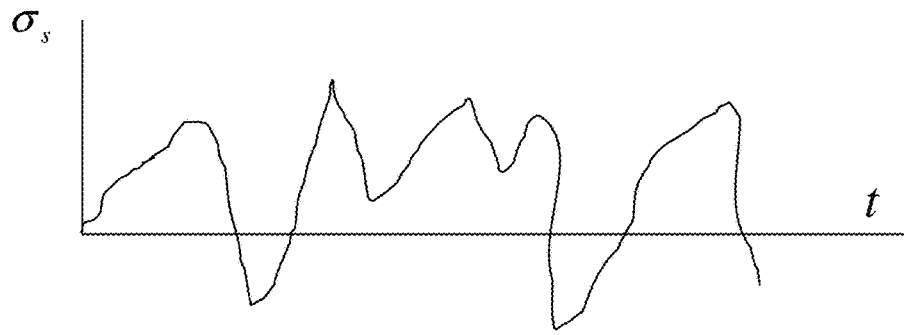
FIGS. 10A and 10B are diagrams showing normal and in-plane shear traction structural variations over time, which are independent of each other.
Figure 10B:
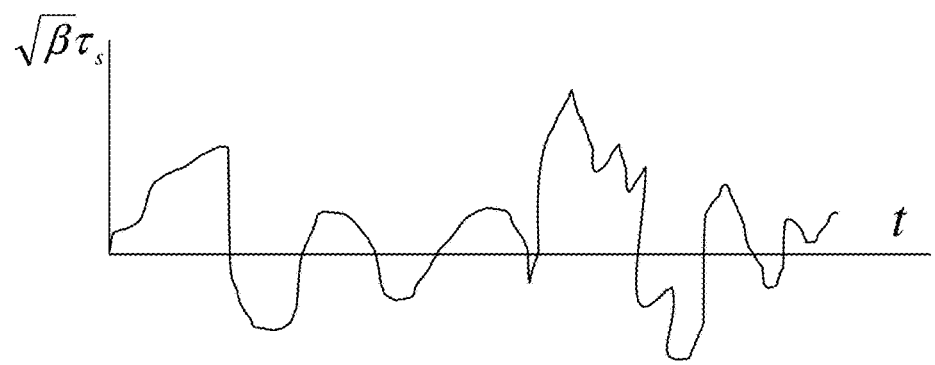
Figure 10C:
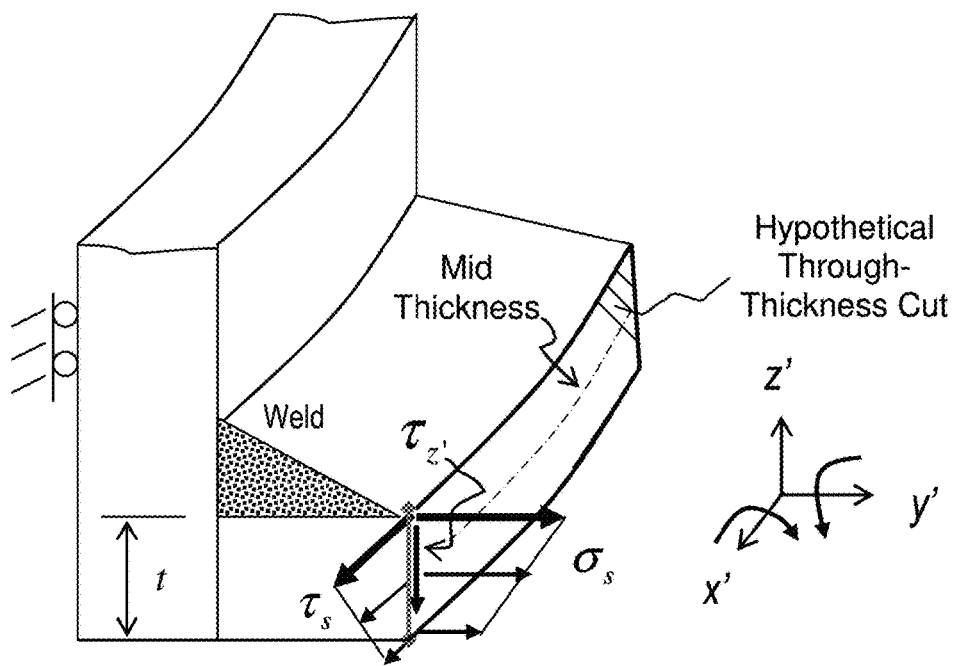
Figure 11:
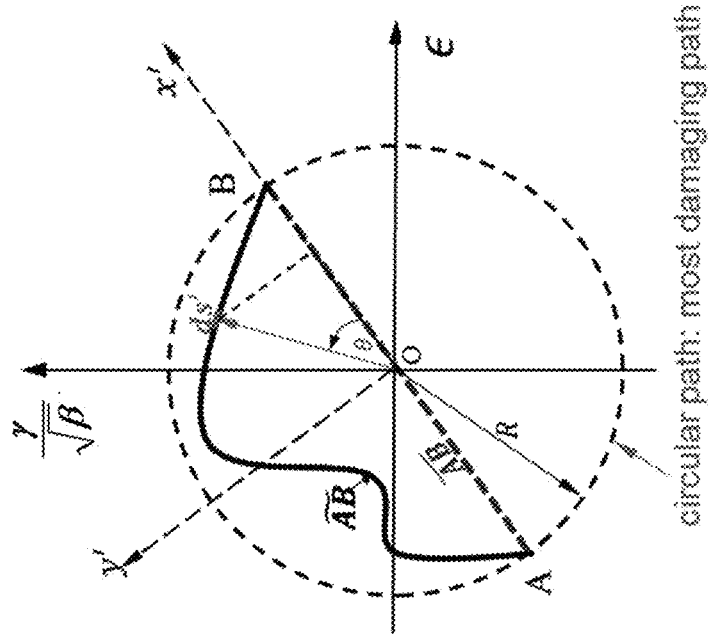
Figure 12:
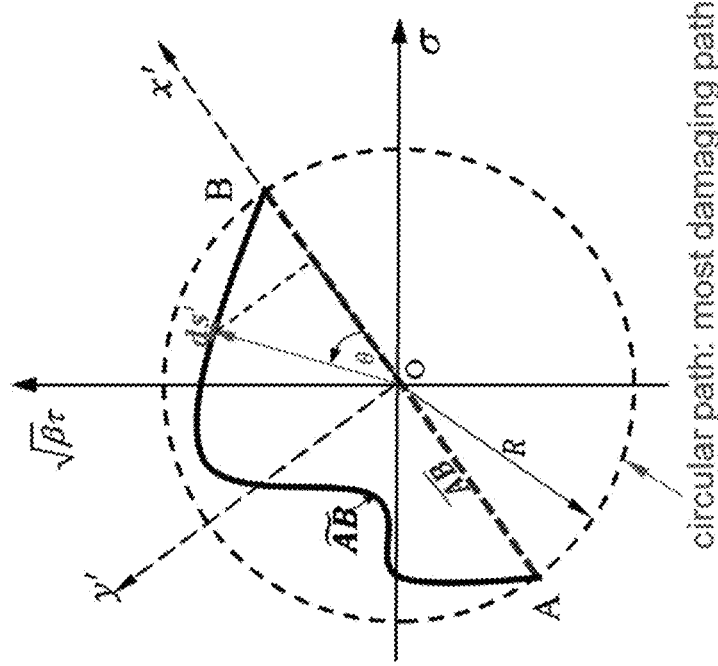
Figure 13:
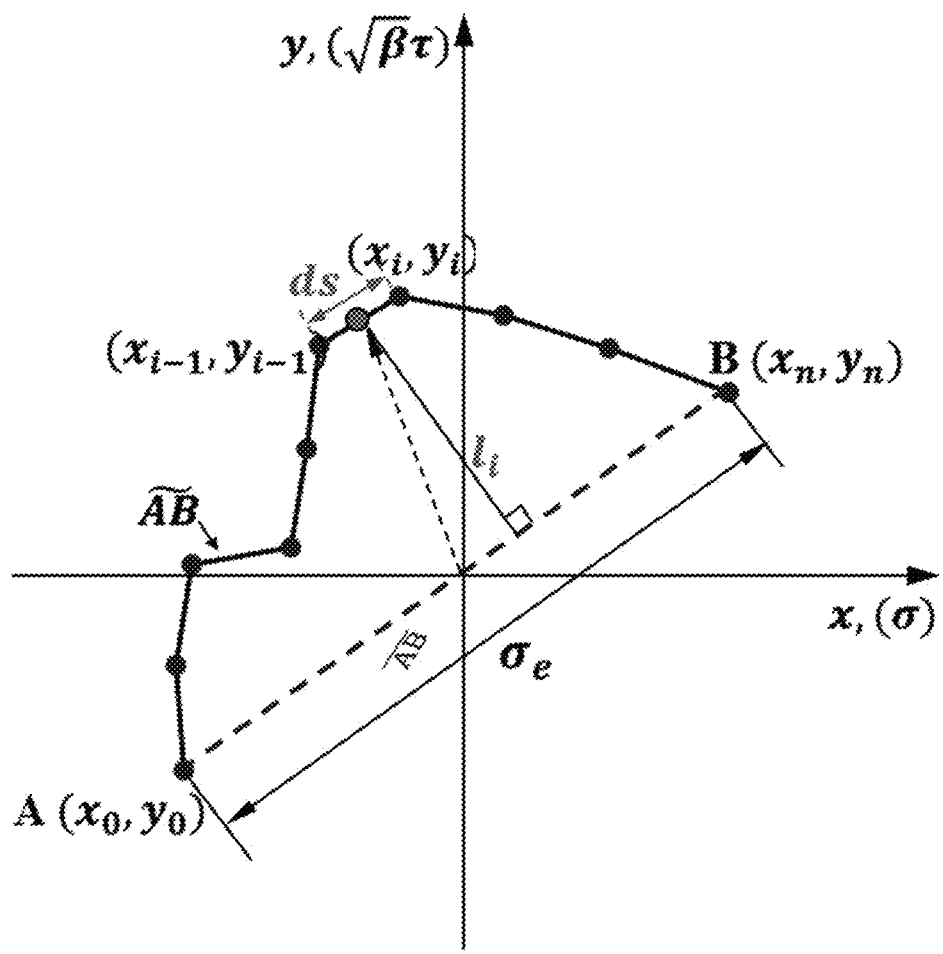
Figure 14A:
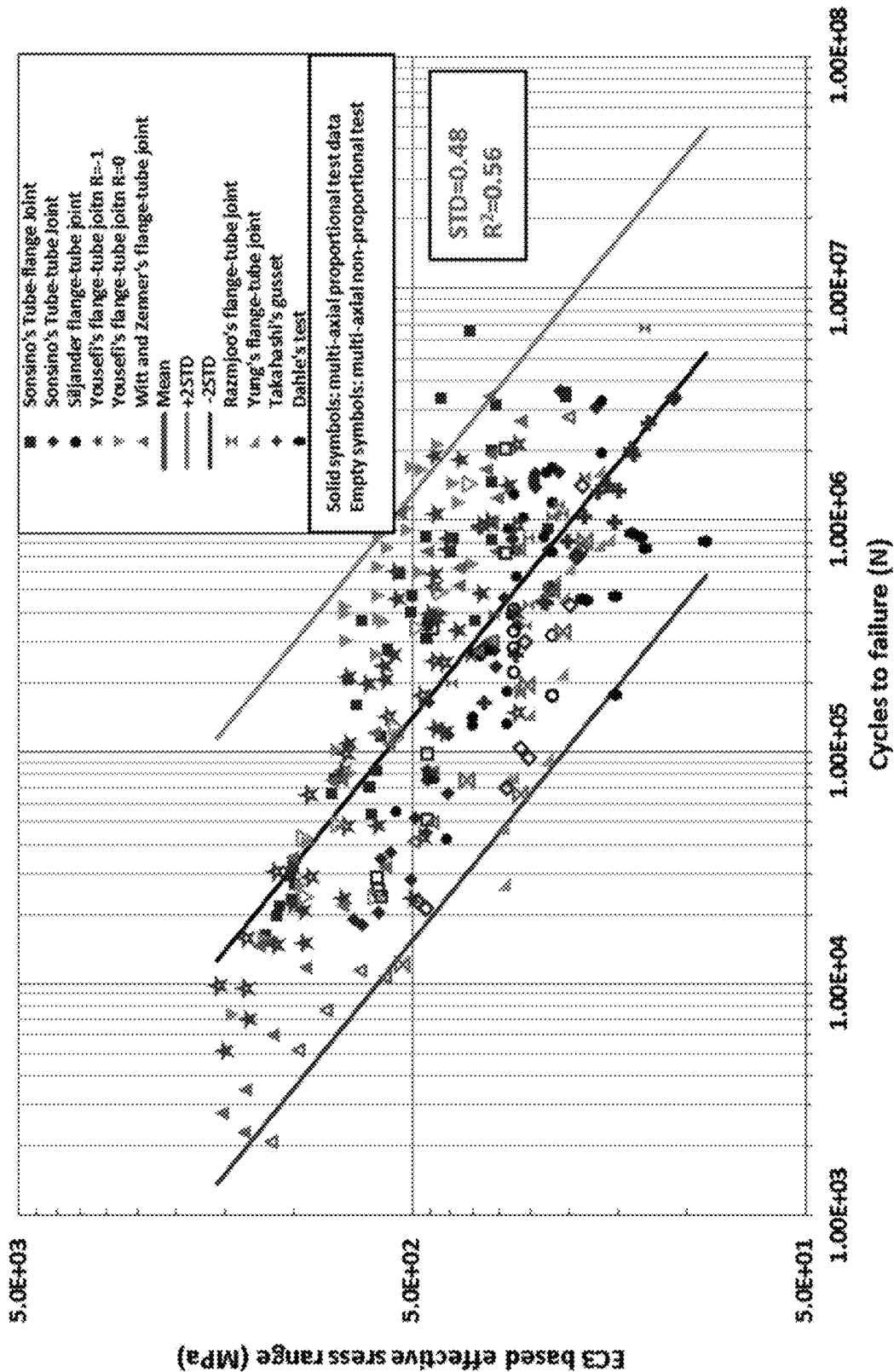
Figure 14B:
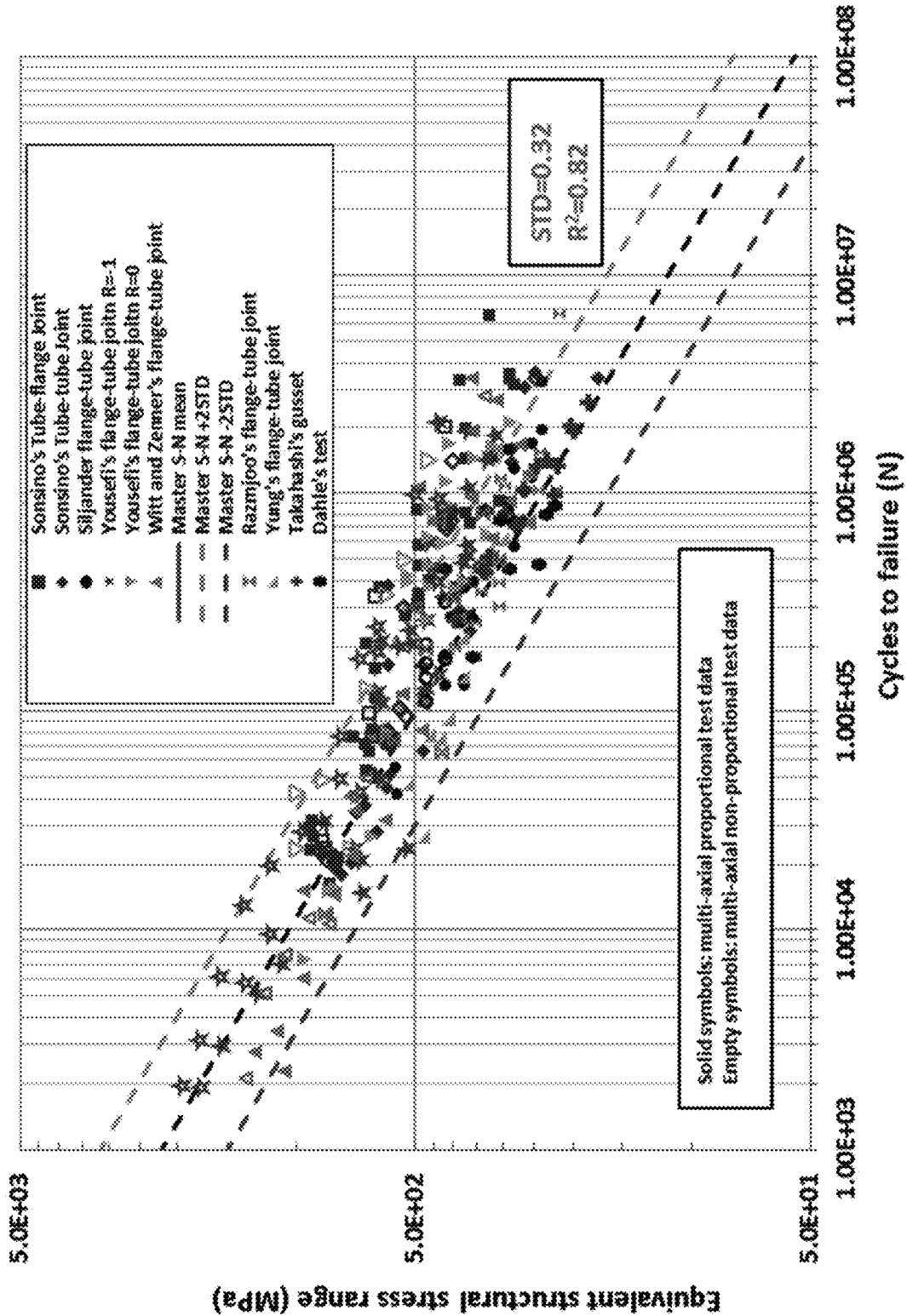
Figure 15A:
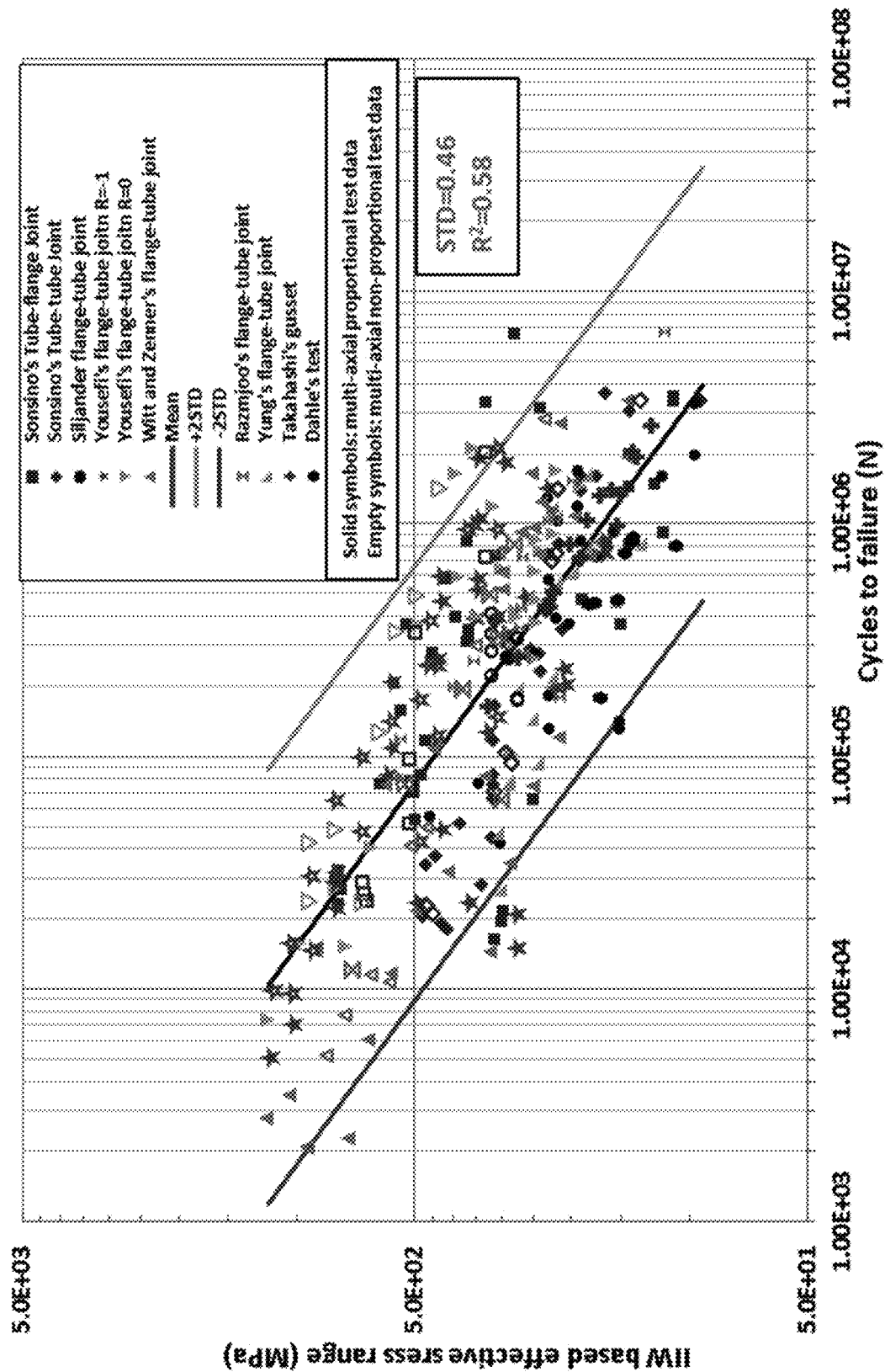
Figure 15B:
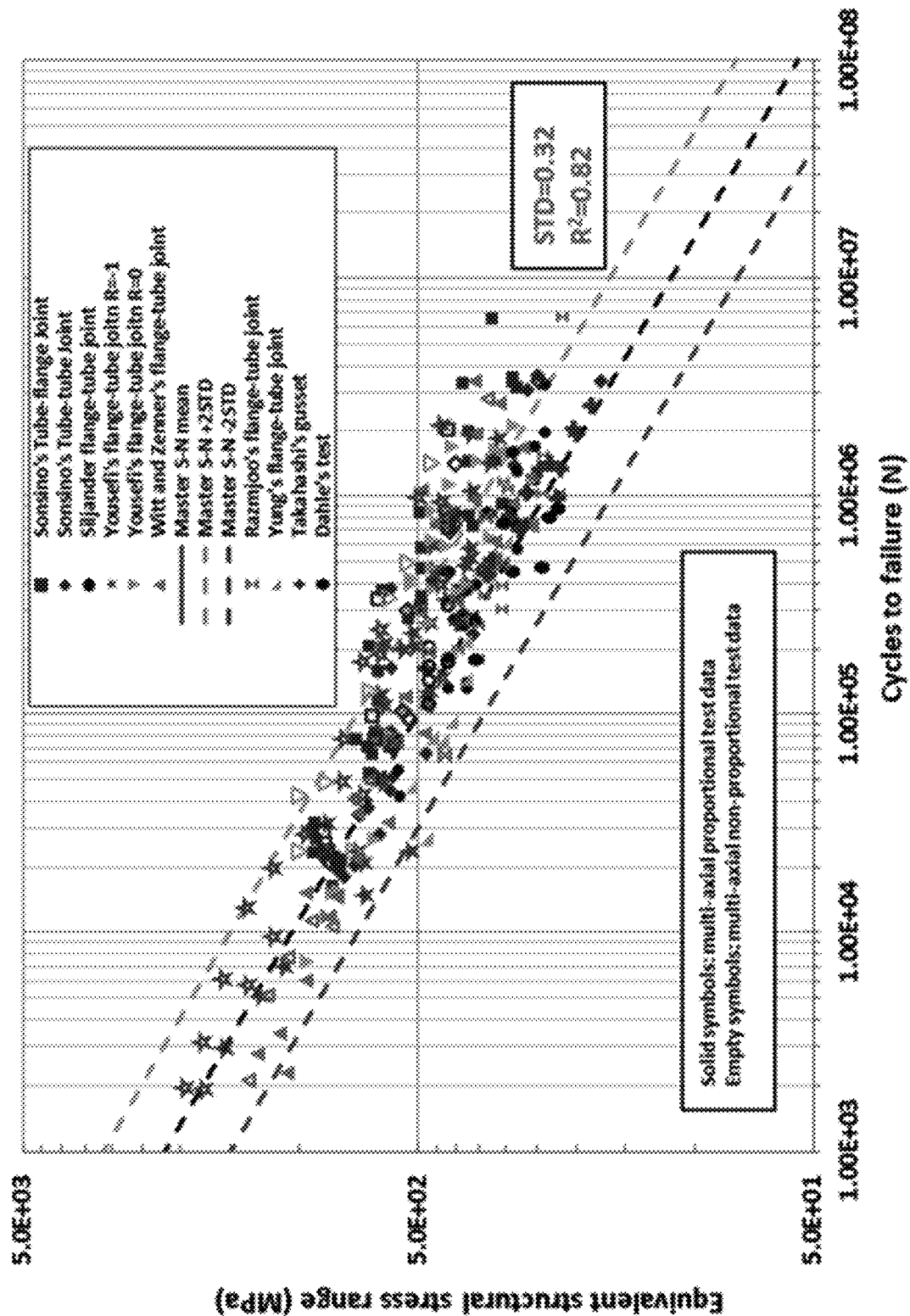
Figure 16A:
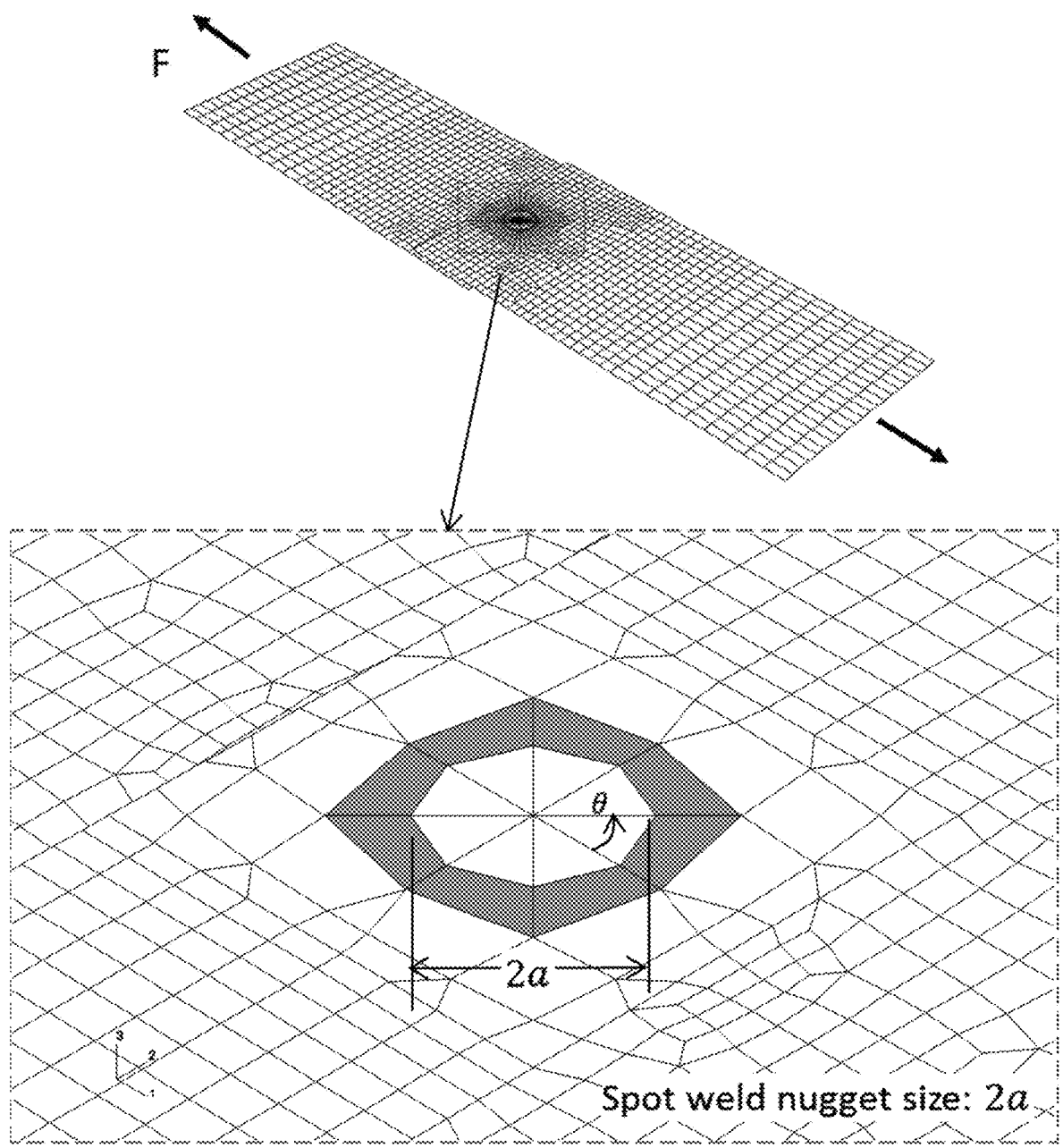
Figure 16B:
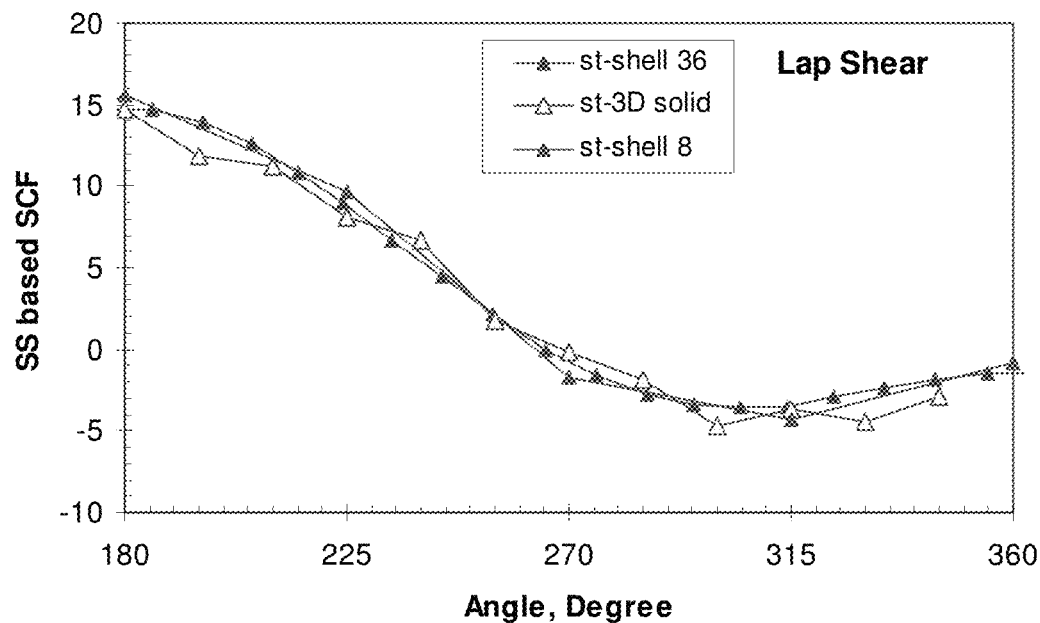
Figure 16C:
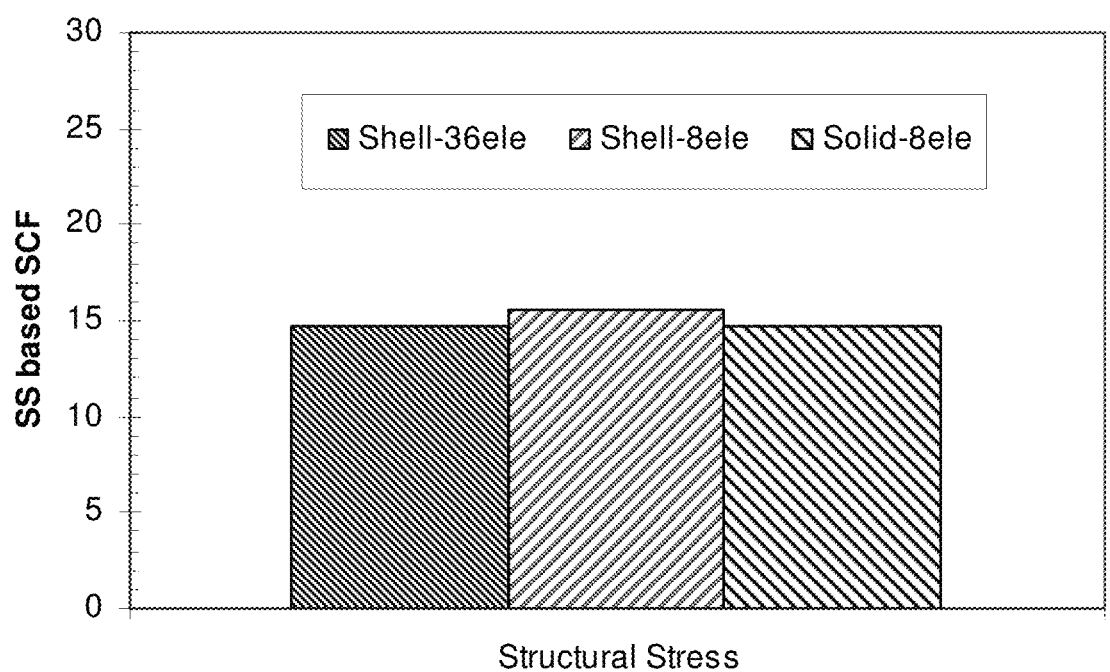
Figure 17:
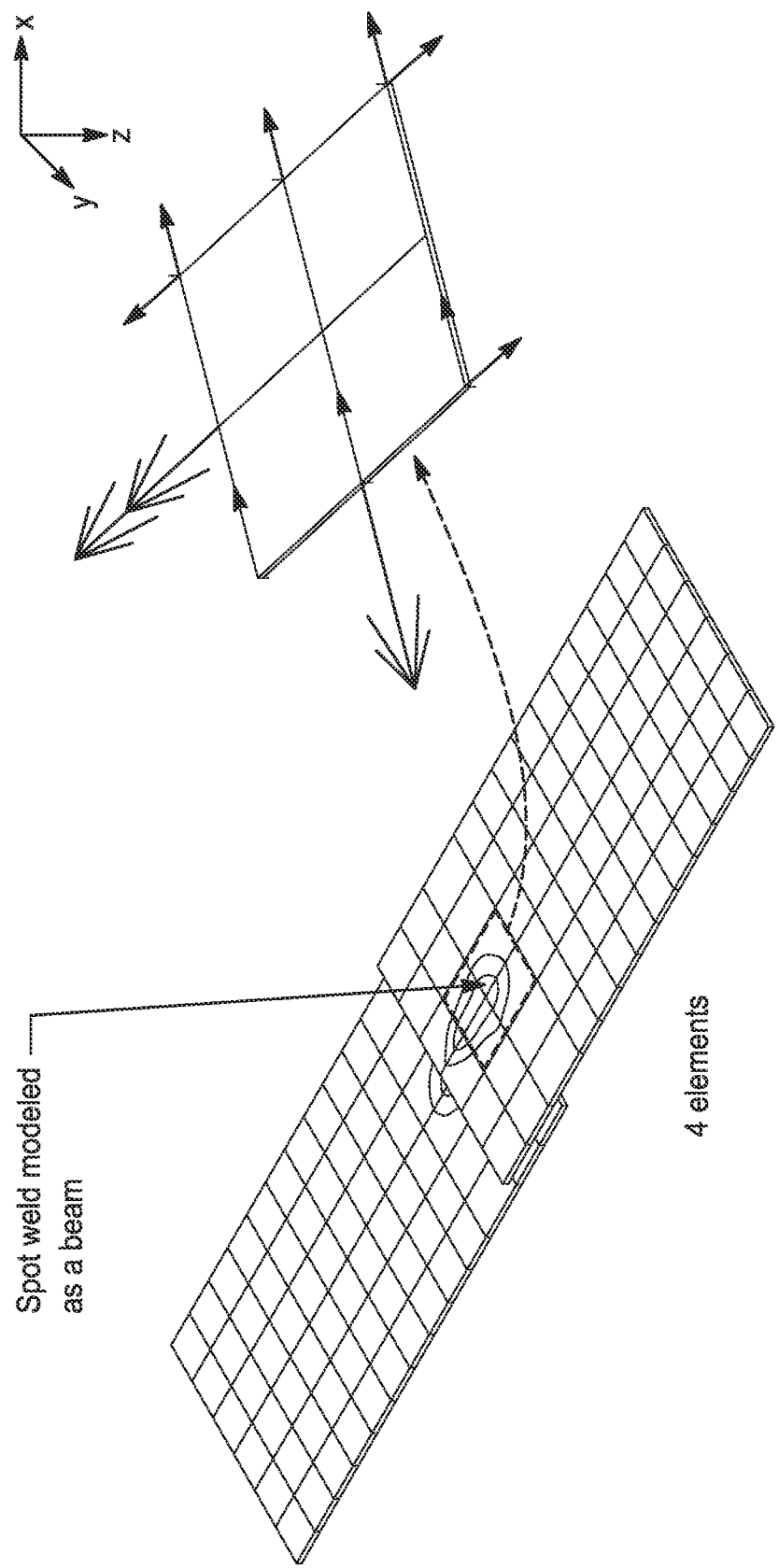
Figure 18:
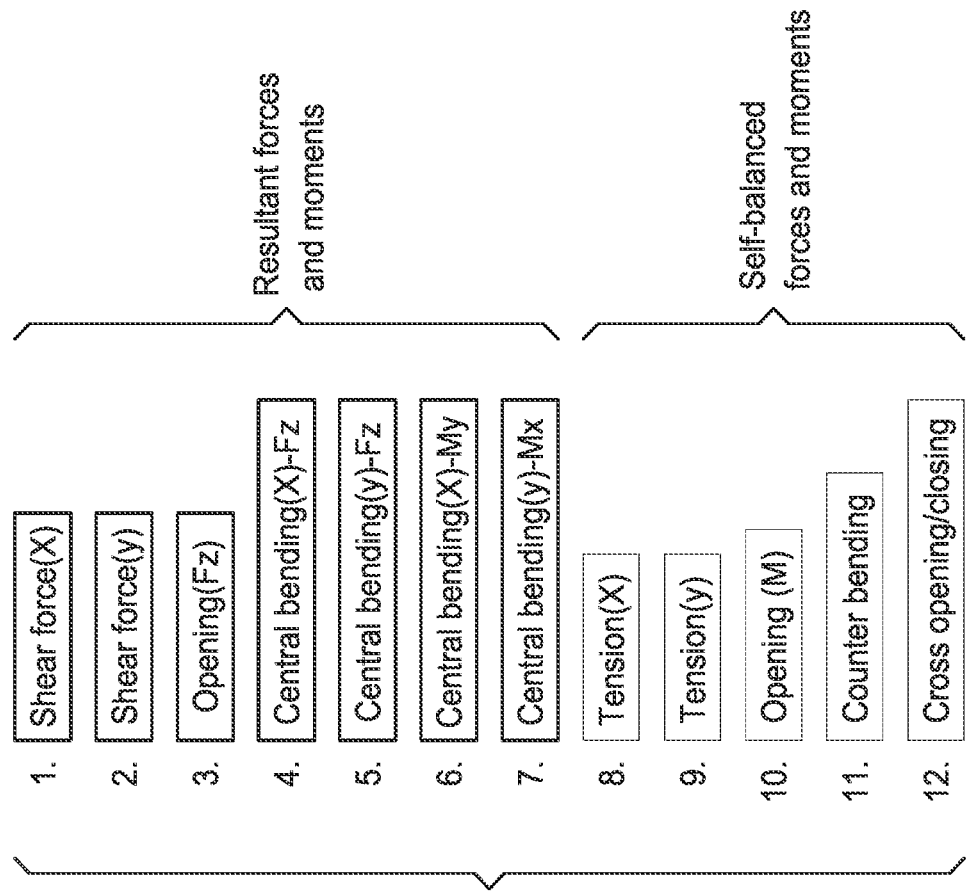
Figure 18:
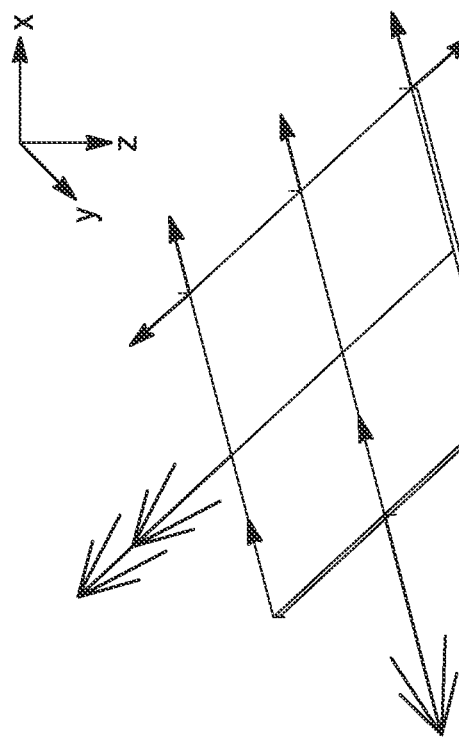
Figure 19A:
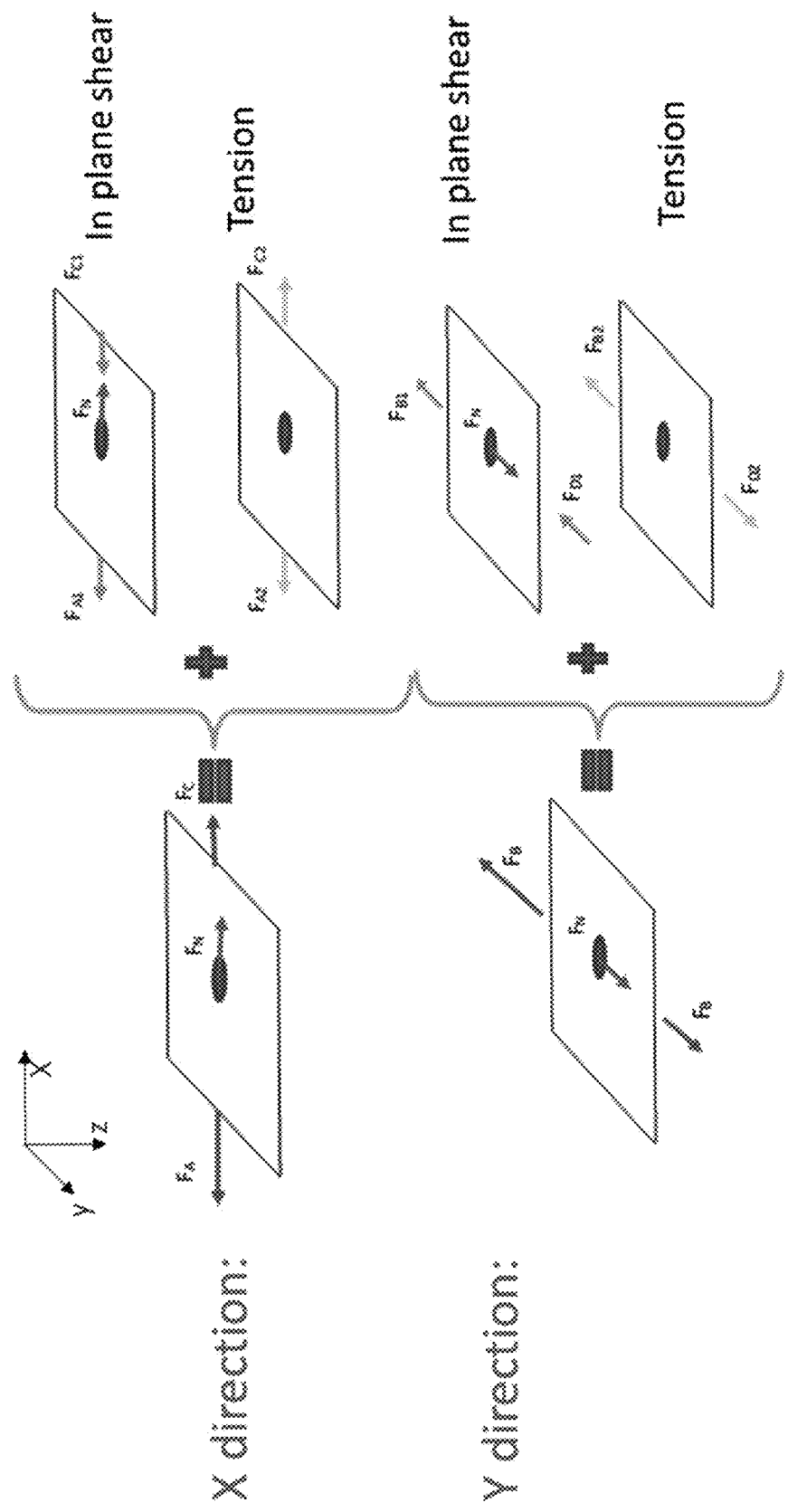
Figure 19B:
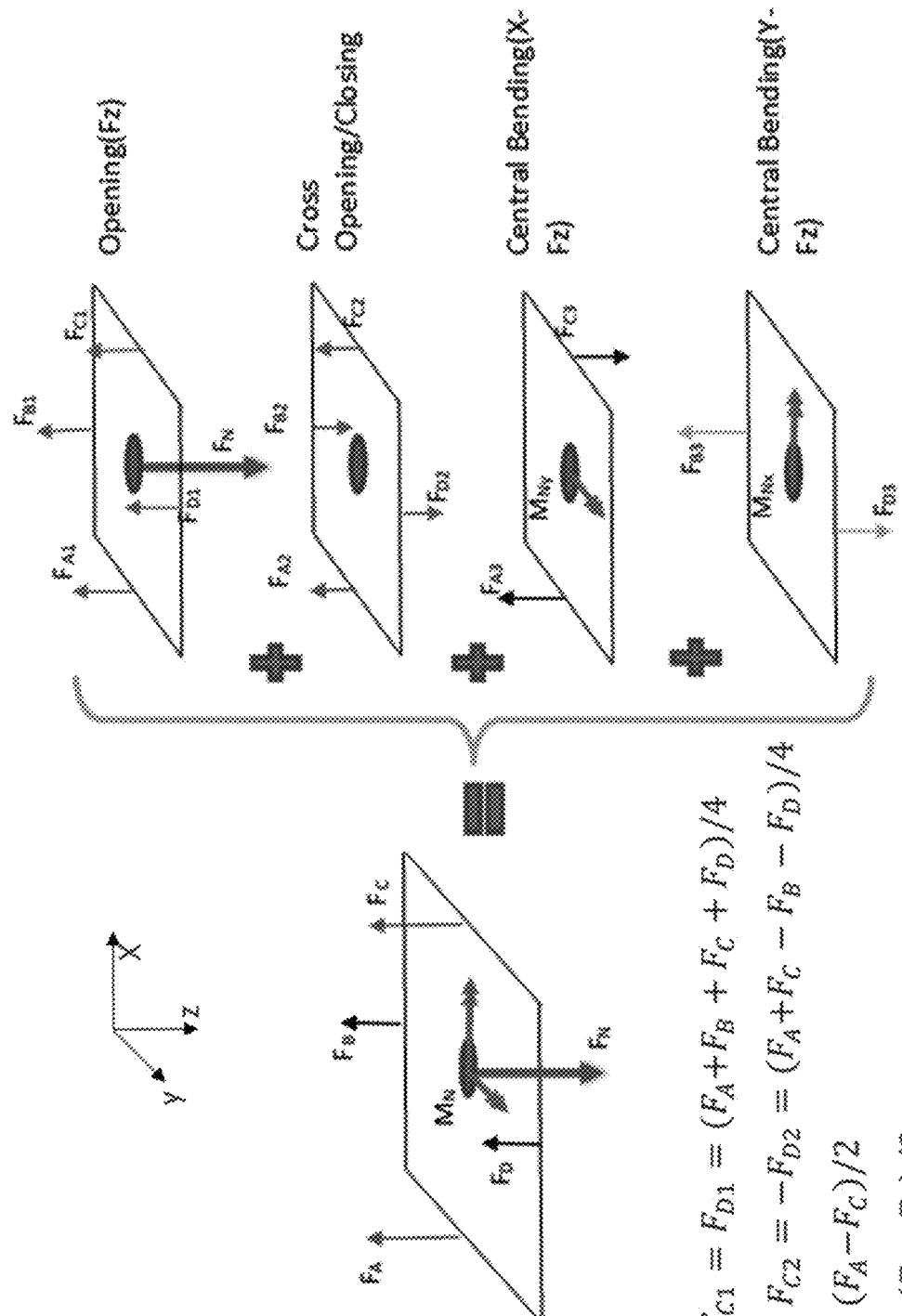
Figure 19C:
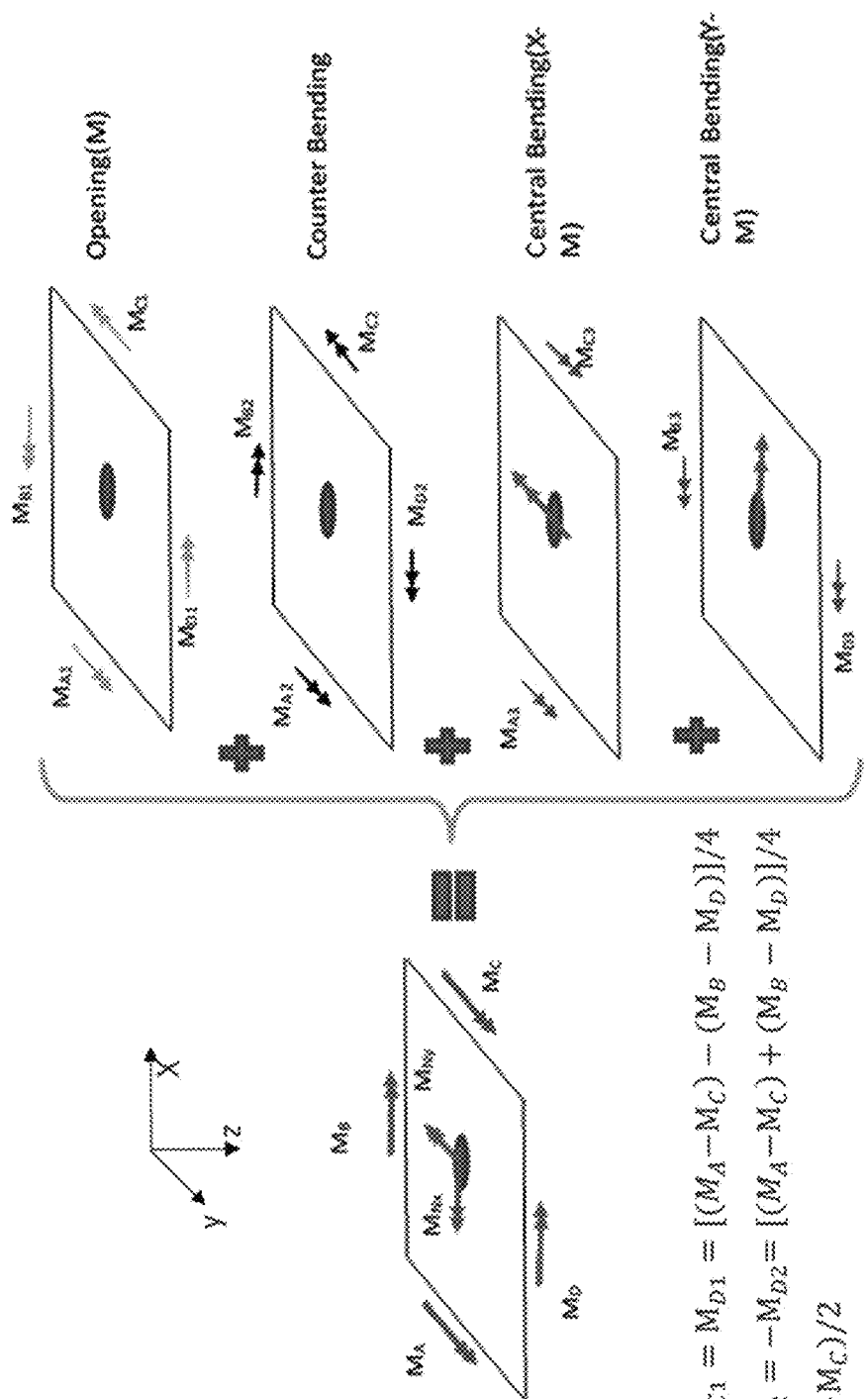
Figure 20:
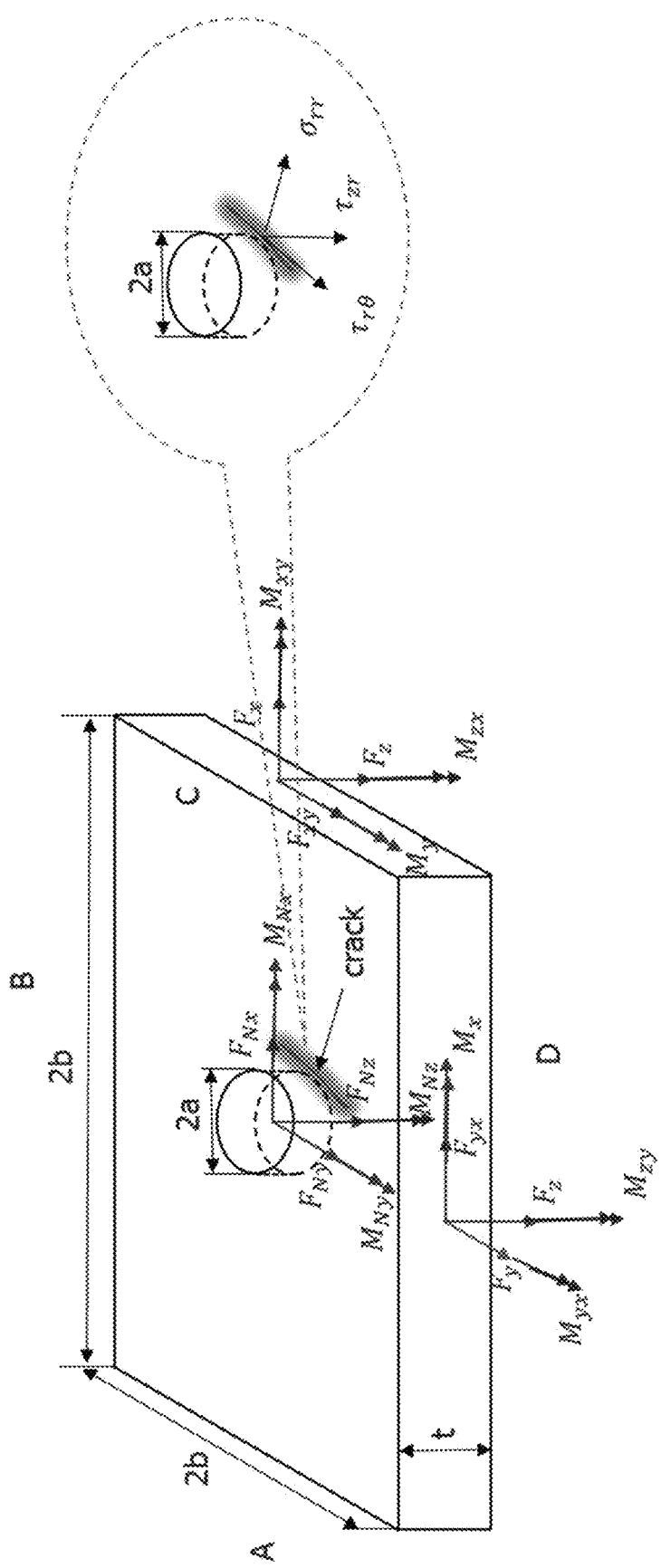
Figure 21:
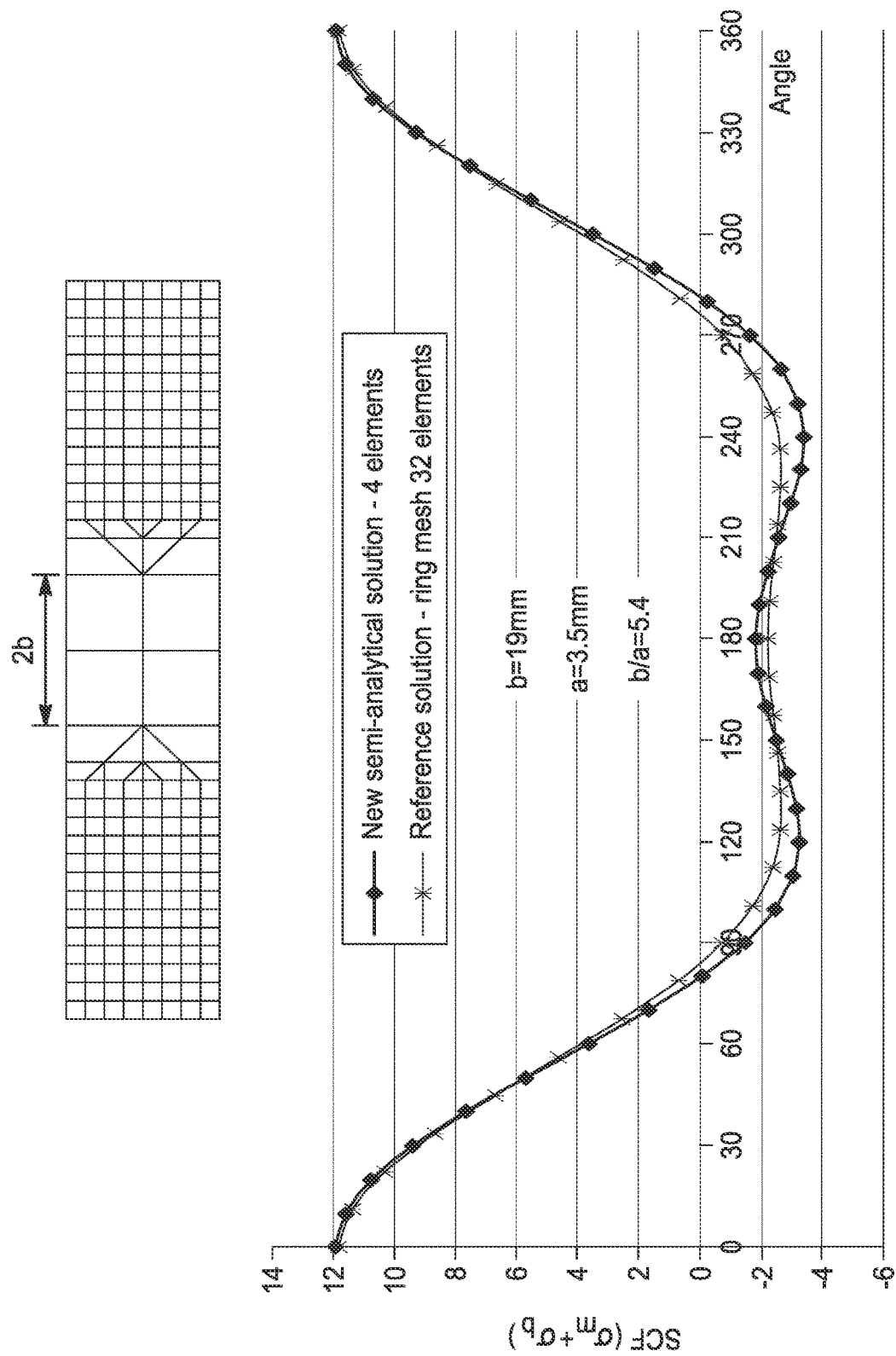

FIG. 10C defines the normal and in-plane shear structural stresses acting on a cut plane at weld;

FIG. 11 is a diagram showing moment of load-path based fatigue damage determination in structural strain plane;

FIG. 12 is a diagram showing moment of load-path based fatigue damage determination in structural stress plane;

FIG. 13 is a diagram showing a typical non-proportional load path from A to B presented in piece-wide linear form;

FIGS. 14A and 14B are graphs comparing the effectiveness in component test data between a Eurocode 3 method and the new method;

FIGS. 15A and 15B are graphs comparing the effectiveness in component test data between IIW method and the new method;

FIG. 16A is a diagram illustrating traction structural stress modeling scheme for a spot weld;

FIGS. 16B and 16C are graphs showing the traction structural stress calculation results;

FIG. 17 is a diagram showing spot weld modeled as a beam element with four plate elements;

FIG. 18 is a diagram depicting force and moment decompositions with respect to edges of modeled spot weld;

FIGS. 19A-19C are diagrams showing the force/moment decomposition details for in-plane edge forces, out-of-plane edge forces and edge moments, respectively;

FIG. 20 is a diagram depicting the definitions of forces/moments and stresses with respect to weld nugget edge in a sheet; and FIG. 21 is graph comparing the semi-analytic solution using four elements at nugget location and FE solution using a refined ring mesh of 32 elements as shown in FIG. 16.

Corresponding reference numerals indicate corresponding parts throughout the several views of the drawings.

DETAILED DESCRIPTION

Example embodiments will now be described more fully with reference to the accompanying drawings.

Figure 1:
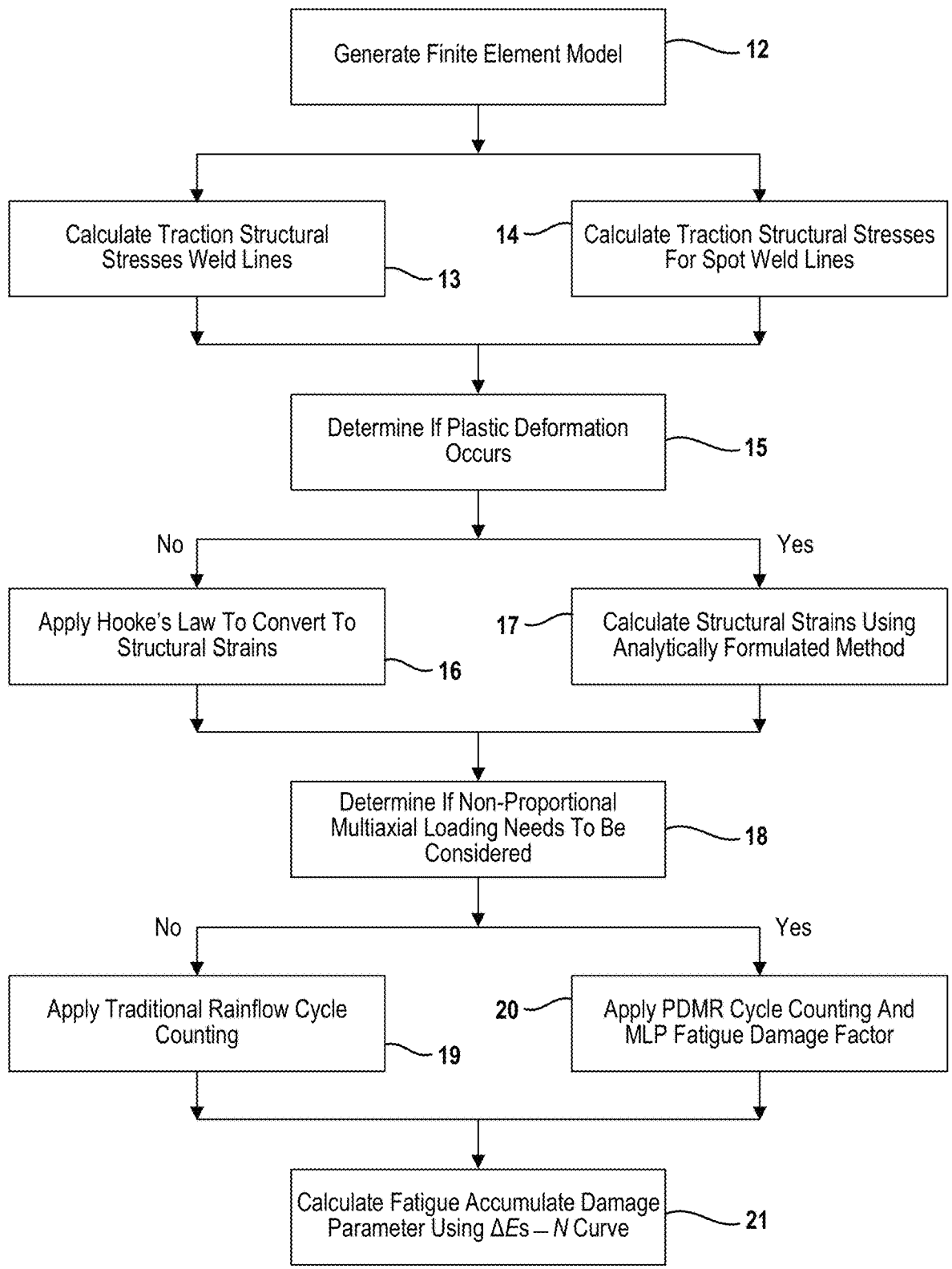
FIG. 1 is a flowchart depicting a unified method for estimating fatigue life for a welded structure under time-varying load.

FIG. 1 depicts a unified method for estimating fatigue life (or fatigue damage) for a given welded structure under a time-varying load. A finite element model for the given structure (or a portion thereof) is first generated at 12. In an example embodiment, a generalized finite element method is applied to the structure although other methods are contemplated by this disclosure.

Next, a distribution of structural stress within the given structure is calculated using the finite element model. Specifically, the distribution of structural stress is determined along a selected cross-section of the structure (i.e., plane of interest) while the structure is subject to a time-varying load. In the example embodiment, the type of weld is identified and the distribution of structural stress is calculated in accordance with the type of weld. For example, the weld may be a linear type of weld as indicated at 13 or a spot type of weld as indicated at 14. Calculating the distribution of structural stress for two types of welds is further described below.

For a linear type of weld, stress distribution is computed with a generalized traction structural stress method which is based on nodal forces and nodal moments which can be both used for shell, plate, and 3D continuum element models. In summary, the distribution of structural stress for a linear type weld is calculated by identifying weld line positions in terms of finite element nodes in the finite element model and elements contributing nodal forces; transforming nodal forces and moments into line forces and line moments, respectively; and calculating structural stresses at each nodal position along the weld line by dividing line force by plate thickness and line moment by section modulus.

Figure 2A:
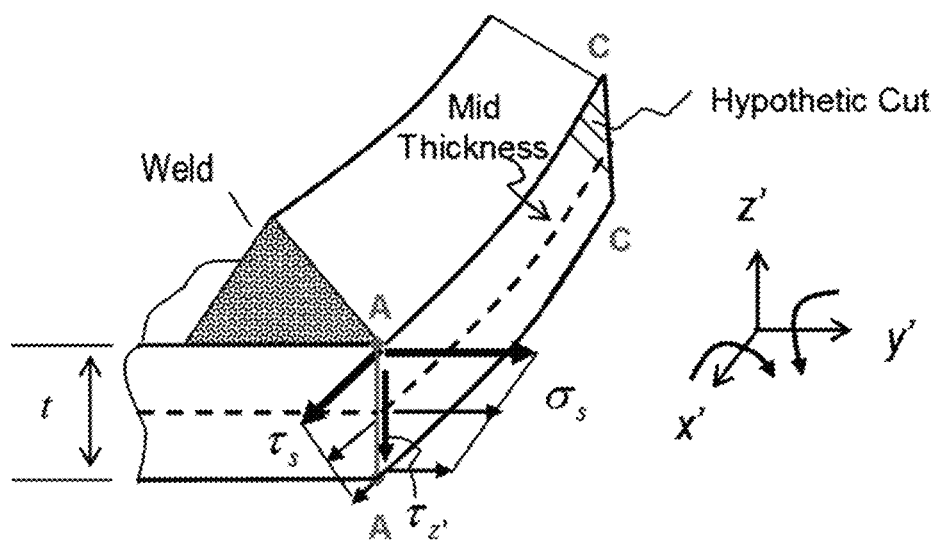
FIG. 2A is a diagram illustrating a cut plane in a three-dimensional model for an arbitrarily curved weld.
Figure 2B:
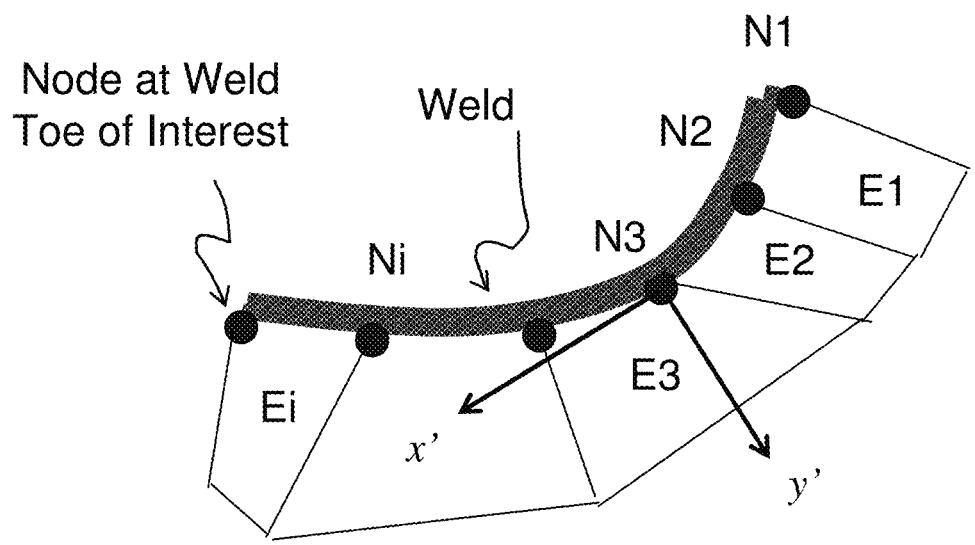
FIG. 2B is a diagram illustrating a cut line in a shell/plate element model.

When dealing with plate or shell element model with a weld line as indicated in FIGS. 2A and 2B, a good mesh-insensitivity in stress determination along a weld location is ensured by using a system of simultaneous equations given below:

$$\begin{Bmatrix} F_1 \\ F_2 \\ F_3 \\ \vdots \\ \vdots \\ F_n \end{Bmatrix} = \begin{bmatrix} \frac{l_1}{3} & \frac{l_1}{6} & 0 & 0 & \cdots & 0 \\ \frac{l_1}{6} & \frac{(l_1+l_2)}{3} & \frac{l_2}{6} & 0 & \cdots & 0 \\ 0 & \frac{l_2}{6} & \frac{(l_2+l_3)}{3} & \frac{l_3}{6} & 0 & 0 \\ 0 & 0 & \ddots & \ddots & \ddots & 0 \\ \vdots & \ddots & \ddots & \ddots & \frac{(l_{n-2}+l_{n-1})}{3} & \frac{l_{n-1}}{6} \\ 0 & \cdots & \cdots & 0 & \frac{l_{n-1}}{6} & \frac{l_{n-1}}{3} \end{bmatrix} \begin{Bmatrix} f_1 \\ f_2 \\ f_3 \\ \vdots \\ \vdots \\ f_n \end{Bmatrix} \quad (1)$$

In the above equation, $F_1, F_2, \ldots, F_n$ are nodal forces with respect to elements $E_1, E_2, \ldots, E_{n-1}$, and $f_1, f_2, \ldots f_n$ are line forces at Node 1, 2, ... n in the direction of local y' to be solved. In addition, the corresponding weld toe element edge lengths along the weld are designated as $I_1, I_2, \ldots, I_{n-1}$. Note that for the case shown in FIGS. 2A and 2B where four-node linear elements are assumed, there are n−1 element edges for a total number of n nodes along the weld line. The corresponding line moments can be calculated in the same manner. Both the coordinate transformations of the nodal force vectors from the global x-y-z to the local x'-y'-z' and the solution of the system of linear equations of Eq. (1) can be coded as a post-processor for automatically performing the traction structural stress calculation as:

$$\sigma_s = \sigma_m + \sigma_b = \frac{f_{y'}}{t} - \frac{6m_{x'}}{t^2} \quad (2)$$

$$\tau_s = \tau_m + \tau_b = \frac{f_{x'}}{t} + \frac{6m_{y'}}{t^2}$$

at each nodal position as illustrated in FIGS. 2A and 2B.

If parabolic elements (i.e., with three nodal positions on each element edge) are used, Eq. (1) can be written as follows:

$$\begin{Bmatrix} F_1 \\ F_2 \\ F_3 \\ \vdots \\ \vdots \\ \vdots \\ \vdots \\ F_n \end{Bmatrix} = \begin{bmatrix} \frac{(2 \cdot l_1)}{(3)} & \frac{l_1}{6} & \frac{-l_1}{30} & 0 & 0 & \ldots & \ldots & 0 & 0 \\ \frac{l_1}{15} & \frac{(8 \cdot l_1)}{(15)} & \frac{l_1}{15} & 0 & 0 & \ldots & \ldots & 0 & 0 \\ \frac{-l_1}{30} & \frac{l_1}{15} & \frac{(2 \cdot (l_1+l_2))}{(15)} & \frac{l_2}{15} & \frac{-l_2}{30} & 0 & 0 & \vdots & \vdots \\ 0 & 0 & \frac{l_2}{15} & \frac{(8 \cdot l_2)}{(15)} & \frac{l_2}{15} & 0 & 0 & \vdots & \vdots \\ 0 & 0 & \ddots & \ddots & \ddots & \ddots & \ddots & 0 & 0 \\ \vdots & \vdots & 0 & 0 & \ddots & \ddots & \ddots & 0 & 0 \\ \vdots & \vdots & 0 & 0 & \frac{\left(-l_{\frac{n-3}{2}}\right)}{(30)} & \frac{\left(l_{\frac{n-3}{2}}\right)}{(15)} & \frac{\left(2 \cdot \left(l_{\frac{n-3}{2}} + l_{\frac{n-1}{2}}\right)\right)}{(15)} & \frac{(l_{\frac{n-1}{2}})}{(15)} & \frac{(-l_{\frac{n-1}{2}})}{(15)} \\ 0 & 0 & \ldots & \ldots & 0 & 0 & \frac{l_{\frac{n-1}{2}}}{15} & \frac{\left(8 \cdot l_{\frac{n-1}{2}}\right)}{(15)} & \frac{l_{\frac{n-1}{2}}}{15} \\ 0 & 0 & \ldots & \ldots & 0 & 0 & \frac{-l_{\frac{n-1}{2}}}{30} & \frac{l_{\frac{n-1}{2}}}{15} & \frac{\left(2 \cdot l_{\frac{n-1}{2}}\right)}{(15)} \end{bmatrix} \begin{Bmatrix} f_1 \\ f_2 \\ \vdots \\ \vdots \\ \vdots \\ \vdots \\ \vdots \\ f_n \end{Bmatrix} \quad (3)$$

Note that there are 2n+1 nodes for a total of n parabolic element edges along the weld line as depicted in FIGS. 2A and 2B.

Figure 3A:
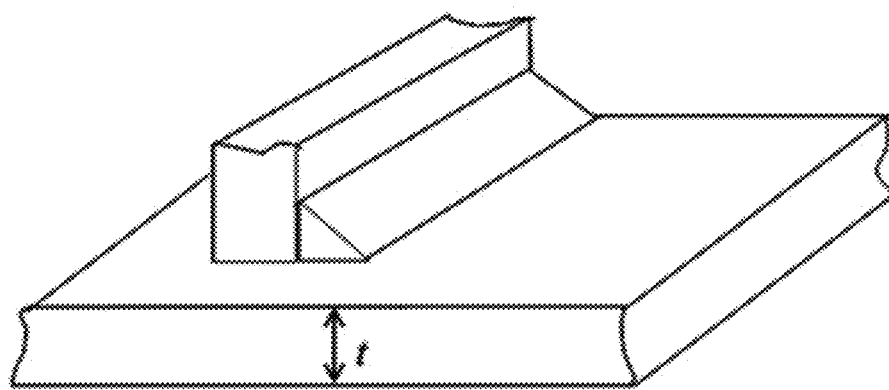
FIG. 3A is a diagram depicting a representative T fillet weld between two plates.
Figure 3B:
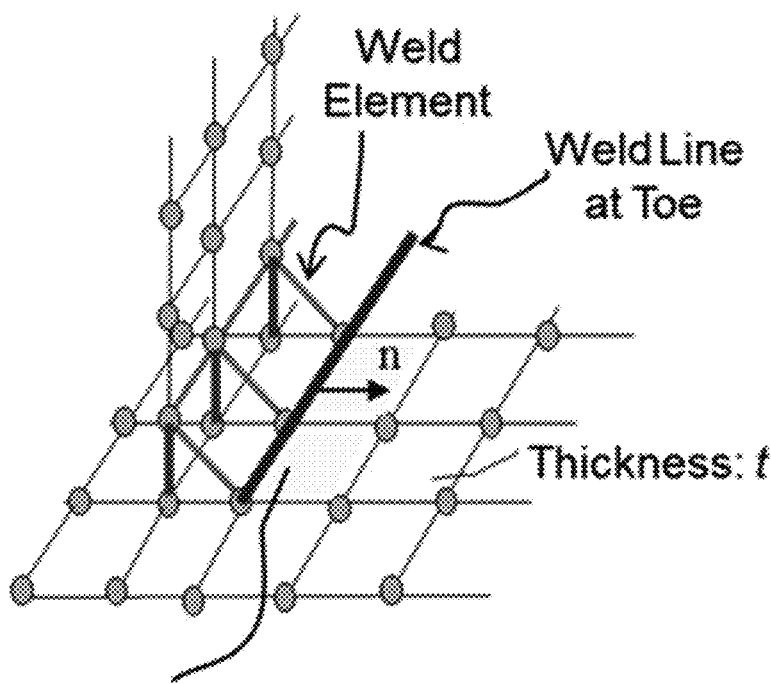
FIG. 3B is a diagram illustrating a shell or plate element representation of the T fillet weld.
Figure 3C:
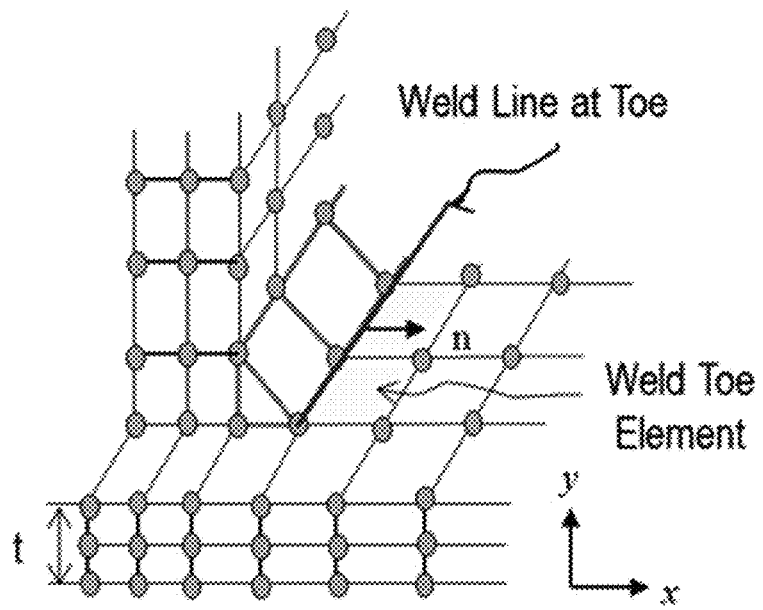
FIG. 3C is a diagram illustrating a 3D solid element model of the T fillet weld.
Figure 3D:
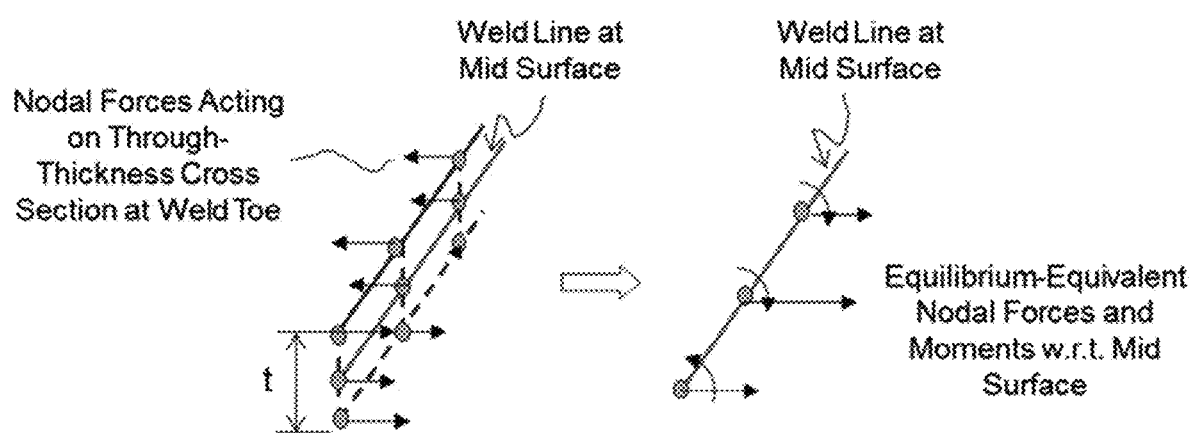
FIG. 3D is a diagram illustrating transformation of nodal forces on the through-thickness cross-section at weld toe to nodal forces and moments with respect to the mid-thickness of the cross section.

With reference to FIGS. 3A-3D, if a three dimensional solid element model is used, nodal forces at a plane of interest can be transformed into statically equivalent nodal forces and moments as described in FIG. 3D. Then, the corresponding system of equations either in (1) for linear solid element models or (3) for parabolic solid element models can be used.

For a spot type of weld, the generalized simultaneous equations in Eqs. (1) and (2) can be directly used for achieving an effective mesh-insensitivity for predicting sheet failure mode around spot nugget perimeter by using modeling scheme shown in FIGS. 10A-10C, in which spot weld nugget is represented as 2a within which a "plane-remaining-as-a-plane" constraints are required. With reference to FIGS. 10B and 10C, the traction structural stress calculation results are shown to be mesh-insensitive for fine shell mesh ("Shell-36eel" with 36 elements being used around nugget perimeter), coarse shell mesh ("Shell-36ele" with 36 elements around nugget perimeter), and 3D solid element mesh ("3D solid"). However, in dealing with realistic engineering structures that are spot-welded, such as auto-body structures in which a total of number of spots can reach to thousands, the use of a "ring" type of layout and imposition of "plane-remaining-as-a-plane constraints" can be time-consuming for day to day fatigue/durability assessments in an industrial environment. This difficulty can be eliminated by a novel method, i.e., a novel semi-analytical traction structural stress solution method presented below.

Consider a spot weld with a nugget size of 2a (FIG. 17) which is represented as a beam element on which nodal forces and moments can be collected for calculation of nugget forces and moments as used by existing procedures for nugget failure. Sheet failure modes along weld nugget perimeter, which is the most important failure mode, on which there exist no valid calculation methods, can be modeled by the following steps using the methods presented in this disclosure.

First, extract nodal forces and moments from finite element results in the same manner as described above along the boundary (dashed red lines) with respect to the edges of the square area indicated in the inset of FIG. 17. In this example, the square area was modeled with four square plate elements although more or less plate elements are contemplated.

Second, resultant forces and moments with respect to each of the four edges of the square area (defined in FIG. 17) can be decomposed into a series of simple load cases (up to twelve) as shown in FIG. 18, with each case derived using the process as illustrated in FIG. 19.

Third, traction stresses are calculated along spot weld nugget with respect to sheet using traction stresses contributed by decomposed relevant forces and moments as given in Table 1 below.

Figure 2B:
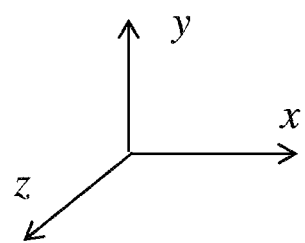

Fourth, superimpose all these component traction stresses with respect opening stress $\sigma_{rr}$ ( ) in Table 1 with respect to a common rotational angle $\theta$ to obtain the final traction stress expressions for each. In this way, the structural stresses for the spot weld are calculated from the nodal forces and moments using a superposition method. Note that $\sigma_{r\theta}$, and $\sigma_{z\theta}$ can be calculated in a similar manner, which will not be discussed here for brevity. Further note that definitions of forces, moments and traction stresses are given in FIG. 2.

One variation of the above method is to use nodal forces and moments along two orthogonal lines intersecting at the beam element location representing spot weld. Nodal forces and moments obtained on each side of the orthogonal lines can then be substituted in place of those obtained at the edges of the square; otherwise, the remainder of the steps are as described in relation to FIGS. 20, 21, and 22. While reference has been made to two particular technique for calculating stress distribution in a structure, other techniques also fall within the broader aspects of this disclosure.

TABLE 1

| Decomposed forces/moments | Analytical solution of opening traction stress ($\sigma_{rr}$) |
|---|---|
| In-plane shear (X): | $\sigma_{rr} = -\dfrac{F_{Nx}\cos\theta}{2\pi at}$ |
| In-plane shear (y): | $\sigma_{rr} = -\dfrac{F_{Ny}\cos\left(\theta + \dfrac{\pi}{2}\right)}{2\pi at}$ |
| Opening (Fz): | $\sigma_{rr} = \dfrac{3F_{Nz[(b^2-a^2)(-1+v)-2b^2(1+v)\ln(b/a)]}}{2\pi t^2[a^2(-1+v)-b^2(1+v)]}$ |

TABLE 1-continued

| Decomposed forces/moments | Analytical solution of opening traction stress ($\sigma_{rr}$) |
|---|---|
| Central bending (Fz): | $\sigma_{rr} = \dfrac{3M'(a^2 - b^2)[a^2(-1+v) - b^2(3+v)]\sin\theta}{\pi a t^2 [a^4(-1+v) - b^4(3+v)]}$ where M' is central bending caused by out-of-plane edge forces |
| Central bending (M): | $\sigma_{rr} = \dfrac{3M(a^2 - b^2)\sin\theta}{\pi a t^2 (a^2 + b^2)}$ where M' is central bending caused by edge moments |
| Tension (X): | $\sigma_{rr} = \dfrac{\tilde{F}_x}{t}\left(\dfrac{1}{1+v} + \dfrac{2}{3-v}\cos(2\theta)\right)$ |
| Tension (y): | $\sigma_{rr} = \dfrac{\tilde{F}_x}{t}\left(\dfrac{1}{1+v} + \dfrac{2}{3-v}\cos\left(2\left(\theta + \dfrac{\pi}{2}\right)\right)\right)$ |
| Counter bending: | $\sigma_{rr} = -\dfrac{6\tilde{M}_y}{t^2 XY}[b^2 X + 2Yb^4(a^4 + b^4)\cos(2\theta)]$ |
| Opening (M): | $\sigma_{rr} = -\dfrac{6\tilde{M}_c b^2}{y t^2}$ |
| Cross opening/ closing: | $\sigma_{rr} = -\dfrac{6M_{ave}}{t^2 XY}[-2b^2 X - 4Y(a^4 b^4 + b^8)\cos 2\theta]$ where $x = (-1+v)(a^4+b^4)^2 - 4a^2b^2(1+v)$: $y = (-1+v)a^2 - b^2(1+v)$ |

A lap shear spot welded specimen (lap shear condition) is analyzed to show the effectiveness of the new semi-analytical traction structural stress solution described in the above. FIG. 21 compares the new solution along the entire circumference along weld nugget edge with the solution with a refined "ring mesh" of 32 elements (similar to the one shown in FIG. 10A, but more elements being used along nugget perimeter). A good agreement between the two solutions (presented as normalized stresses with respect to remote applied tension or SCF) are evident, even though a very coarse model is used in FIG. 21, which offers a great deal of simplicity without losing any significant accuracy for applications in complex sheet structures, such as automotive structures.

Referring to FIG. 17, one variation of the above method is to use nodal forces and moments along two orthogonal lines intersection at the beam element location representing spot weld. Nodal forces and moments obtained on each side of the orthogonal lines can then be substituted in place of those obtained at the edges of the square. The rest of the steps described in FIGS. 18, 19 and 20 apply.

Returning to FIG. 1, a distribution of structural strain experienced by the structure is determined from the stress distribution values. The determination can varying depending upon if the structure is experiencing plastic deformation, i.e., stress exceeds yield strength of material comprising the given structure. In the case that the stress is less than yield strength of material, the distribution of structural strain experienced within the given structure is calculated using Hooks law as indicated at 16.

In the case that the stress exceeds yield strength of material, the distribution of structural strain experienced within the given structure is calculated using an analytically formulated method as indicated at 17. The distribution of structural strain is calculated in part from the calculated distribution of structural stress and the distribution of structural strain is defined in relation to the plane by at least two closed-form expressions which account for stress that exceeds yield strength of material. It is envisioned that the form of the expressions will vary depending on the shape and type of structure, and material stress-strain relation.

Figure 4:
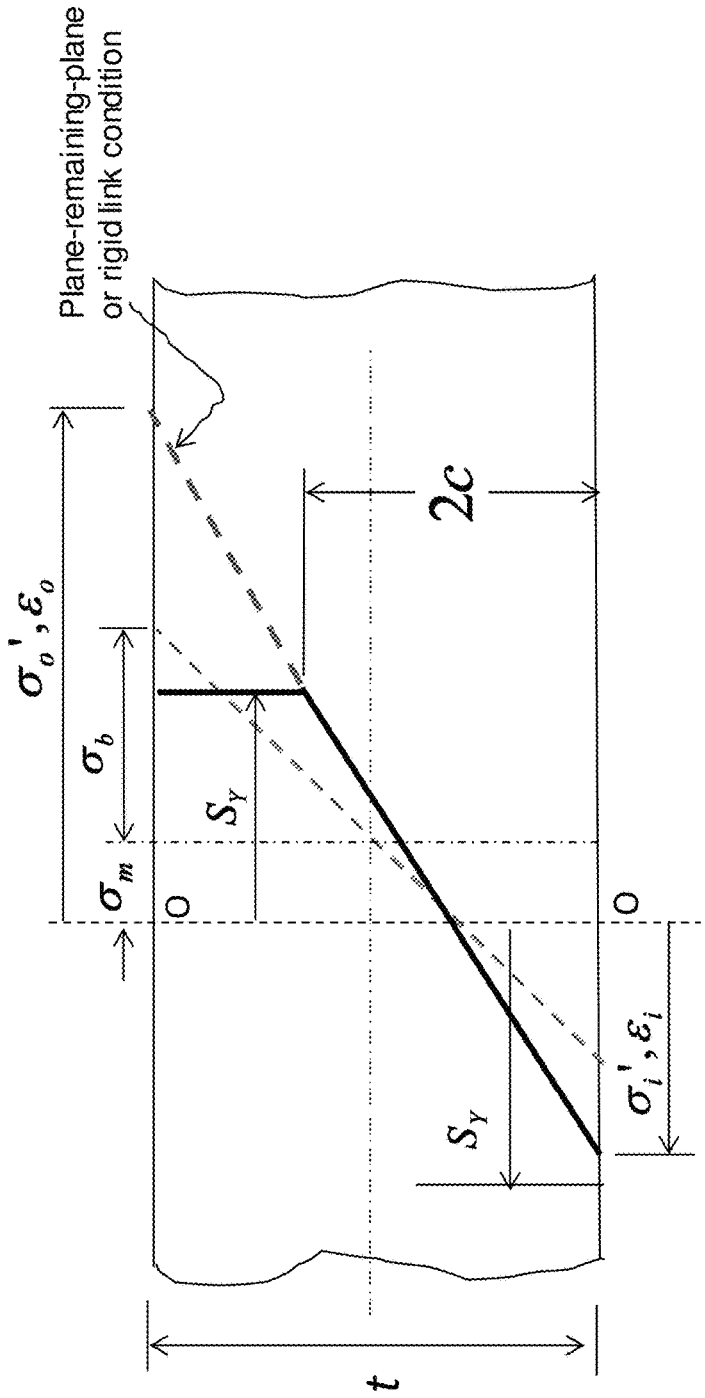
FIG. 4 is a diagram illustrating the structural strain definition and calculation procedure for a plate subject to one side yielding conditions.
Figure 5:
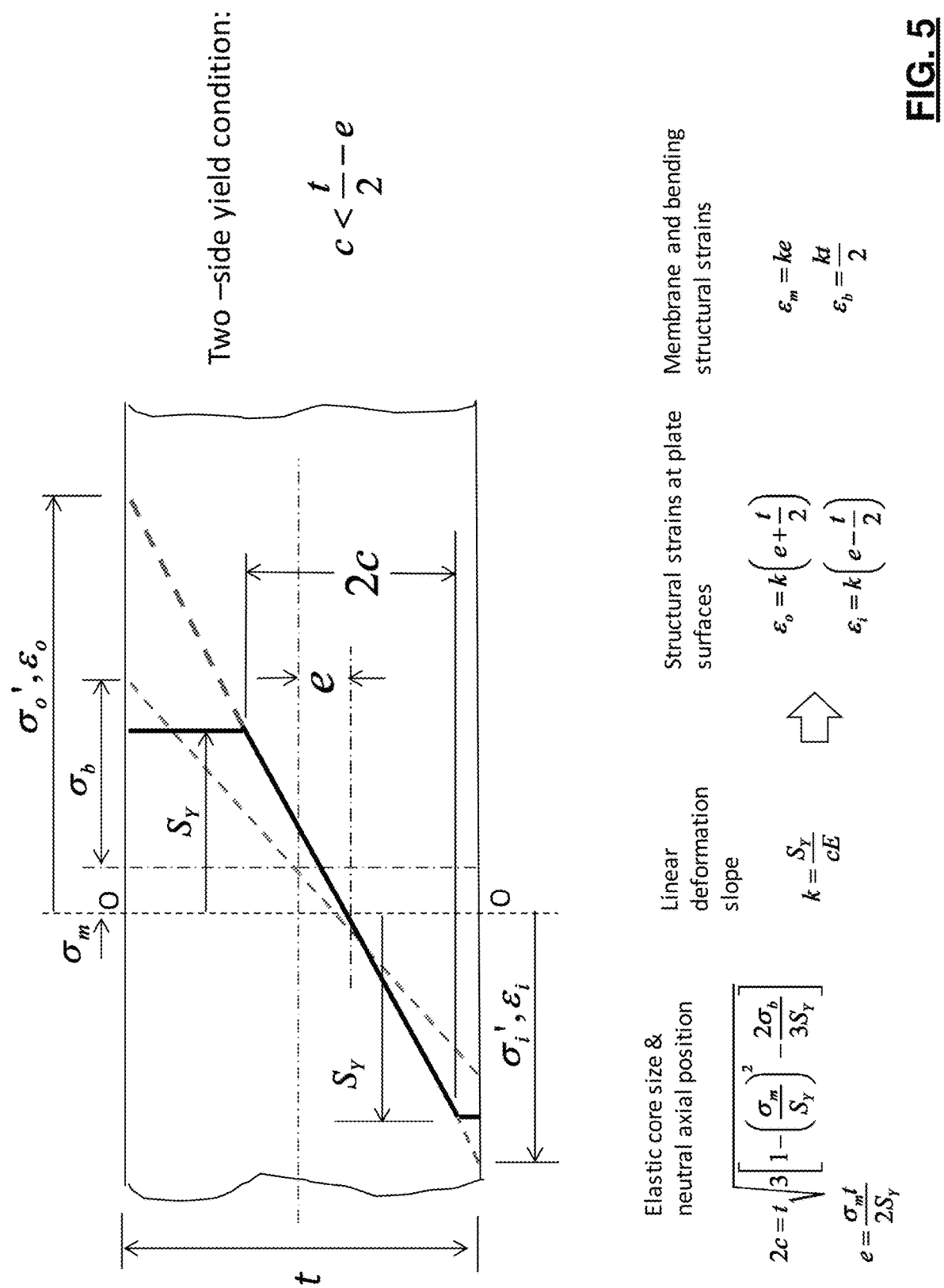
FIG. 5 is a diagram illustrating the structural strain definition and calculation procedure for a plate subject to two side yielding conditions.

FIGS. 4 and 5 illustrate the structural strain definition and calculation procedure for a plate. Referring to FIG. 4, the linear elastically calculated traction stresses can be corrected analytically to satisfy both yield and equilibrium conditions. The corresponding structural strains are given as $\varepsilon_o$ and $\varepsilon_i$ at top and bottom surface, respectively. The membrane and bending parts of the structural strain can be expressed as $\varepsilon_m = (\varepsilon_o + \varepsilon_i)/2$ and $\varepsilon_b = (\varepsilon_o - \varepsilon_i)/2$. For some applications, it may be more convenient to use a pseudo elastic stress definition rather than structural strain. A pseudo-elastic structural stress can be simply defined as $\sigma_s = \sigma_o = E\varepsilon_o$, and its membrane and bending components as $\sigma_m = E\varepsilon_m$ and $\sigma_b = E\varepsilon_b$, respectively. Here, E represent Young's modulus of material. Under general cyclic loading conditions, structural strain range $\Delta\varepsilon_o$ can be used directly for fatigue life evaluation in both high cycle and low cycle fatigue regimes. The results can be presented as a pseudo-elastic stress range as $\Delta\sigma_s' = E\Delta\varepsilon_o$ if so desired.

Earlier structural stress methods were only applicable for linear elastic deformation conditions, i.e., $\sigma_s \leq S_Y$, where $S_Y$ is yield strength of the material of interest. In contrast to earlier structural stress methods, the structural strain parameter presented here is applicable for both linear elastic and elastic-plastic deformation regimes. Consider elastically calculated $\sigma_m$, $\sigma_b$, with $\sigma_m + \sigma_b > S_Y$, as shown in FIG. 4. The corresponding structural strain distributions with bottom surface value $\varepsilon_i$ and top surface value $\varepsilon_o$, satisfying "plane-remains-as-plane" conditions can be obtained with the closed form solutions given below.

Elastic core size & Curvature $$2c = \dfrac{t}{2}\left(\dfrac{3S_Y - 3\sigma_m - \sigma_b}{S_Y - \sigma_m}\right) \Rightarrow$$

$$k = \dfrac{8(S_Y - \sigma_m)^3}{tE(3S_Y - 3\sigma_m - \sigma_b)^2}$$

Structural strain at plate surface $$\varepsilon_o \dfrac{S_Y}{E} + k(t - 2c)$$

$$\varepsilon_i = \dfrac{S_Y}{E} - 2kc$$

Membrane and bending structural strain $$\varepsilon_m = \dfrac{S_Y}{E} + \dfrac{k(t - 4c)}{2}$$

$$\varepsilon_b = \dfrac{kt}{2}$$

Note that parameter k represents the slope of the inclined deformation line across plate thickness.

Referring to FIG. 5, the structural strain definition and the closed form solutions for $\varepsilon_i$ and $\varepsilon_o$ corresponding two side yielding conditions are given as follows.

Elastic core size & neutral axial position    Curvature $$2c = t\sqrt{3\left[1 - \left(\dfrac{\sigma_m}{S_Y}\right)^2 - \dfrac{2\sigma_b}{3S_Y}\right]} \quad k = \dfrac{S_Y}{cE} \Rightarrow$$

$$e = \dfrac{\sigma_m t}{2S_Y}$$

-continued

| Structural strain at plate surface | Membrane and bending structural strain |
|---|---|
| $\varepsilon_o = k\left(e + \dfrac{t}{2}\right)$ | $\varepsilon_m = ke$ |
| $\varepsilon_i = k\left(e - \dfrac{t}{2}\right)$ | $\varepsilon_b = \dfrac{kt}{2}$ |

Fatigue damage parameters can now be determined using the structural strain definitions and calculation procedures set forth above. In the example embodiment, an equivalent structural strain range based fatigue damage parameter is formulated as follows:

$$\Delta E_s = \frac{\Delta \varepsilon_o}{t^{\frac{2-m}{2m}} I(r')^{\frac{1}{m}}} \qquad (4)$$

where $\Delta\varepsilon_o$ stands for structural strain range calculated through procedures given above, t is thickness of a plate section where fatigue cracking is of interest, m is an exponent derived from crack growth data, taking on a value of 3.6, I(r') is a dimensionless polynomial function of bending ratio r, which is defined with respect to structural strains calculated, as:

$$r' = \frac{|\Delta\varepsilon_b|}{|\Delta\varepsilon_m| + |\Delta\varepsilon_b|} \qquad (5)$$

where $\varepsilon_b=(\varepsilon_o-\varepsilon_i)/2$ and $\varepsilon_m=(\varepsilon_o+\varepsilon_i)/2$.

Figure 6:
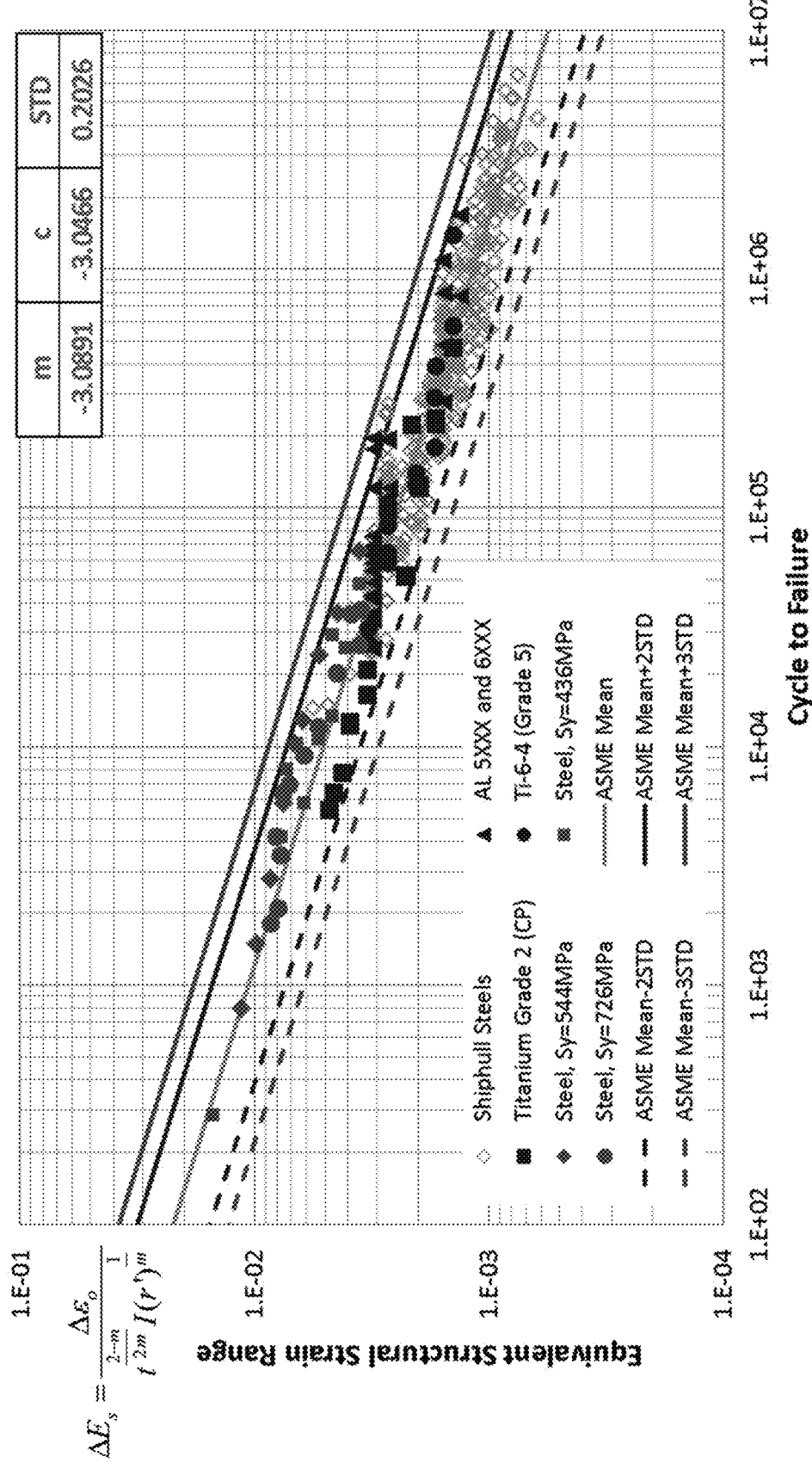
FIG. 6 is a graph of a master E-N curve formulated in accordance with this disclosure.

Referring to FIG. 6, the effectiveness of the equivalent structural strain parameter given in Eq. (4) can be demonstrated by correlating low-cycle and high fatigue test data as well as different materials (e.g., weldments made of structural steels, titanium alloys, as well as aluminum alloys), leading to a master E-N curve. It is important to note that all this data fall within the master S-N scatter band (shown as lines in FIG. 6) after being converted to the structural strain definition introduced here. This suggests the new master E-N curve fully encompasses the master S-N curve adopted by the 2007 ASME Code as a subset of the master E-N curve. If needed, the master E-N curve and its scatter band can be converted to master S-N curve for each class of materials, say all structural steel by multiplying its Young's modulus E.

It follows that a fatigue parameter for the structure is computed at 21 of FIG. 1 using the master E-N curve. In an example embodiment, the fatigue parameter is further defined as fatigue life (i.e., number of cycles to failure) and fatigue life can be derived from the S-N curve for the material, for example as adopted by the 2007 ASME Code. To do so, the S-N curve is converted to an equivalent E-N curve by dividing the values of the S-N curve by Young's modulus, where E is the equivalent structural strain range in place of nominal stress range. Using the structural strain range computed in the step above, the fatigue life can be obtained from the master E-N curve. Without Eq. (4), this data cannot even be put in the same plot. This not only greatly simplify fatigue evaluation procedures for welded structures, but also drastically reduce testing requirements that would be required if conventional fatigue evaluation procedures are used.

In various industries such as petrochemical, power generation, offshore structures, fatigue design and evaluation of pipes and pipework are typically carried out using pipe section nominal stresses (based strength of materials) or pipework finite element analysis. For this type of application, the structural strain method described above can be formulated with respect to whole pipe section, as set forth below.

Figure 7:
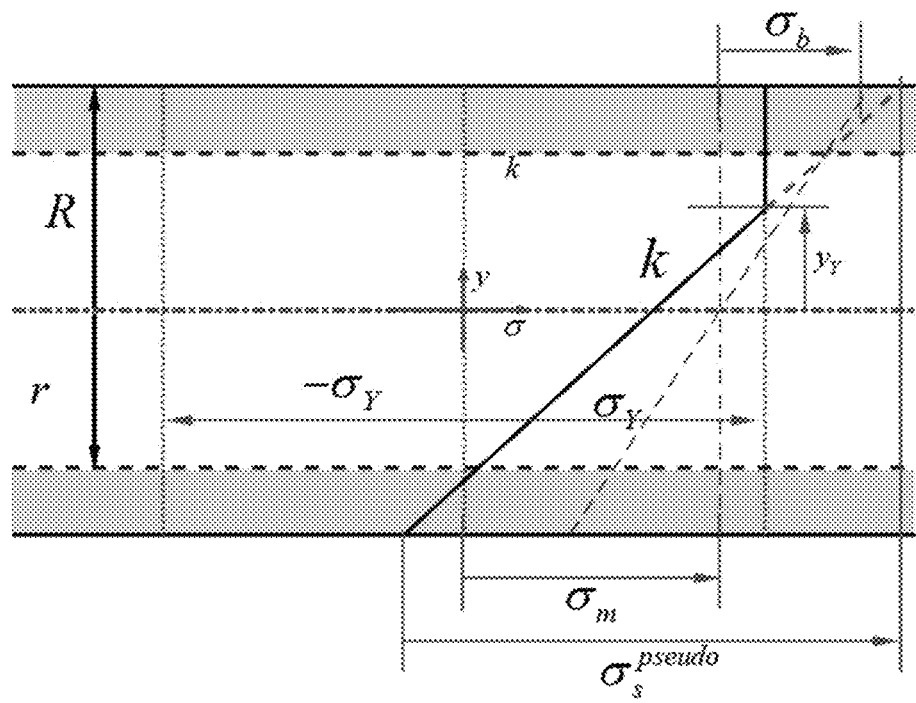
FIG. 7 is a diagram illustrating the structural strain definition and calculation procedure for a pipe section subject to one side yielding conditions.

Referring to FIG. 7, the distribution of pseudo structural stress (or structural strain multiplied by Young's modulus), once elastically calculated $\sigma_m$, $\sigma_b$ using procedures given above, can be formulated as follows in a similar manner to the procedures discussed earlier:

$$\sigma(y) = \begin{cases} S_Y & (y > y_Y) \\ k(y - y_Y) + S_Y & (y < y_Y) \end{cases} \qquad (6)$$

$$0 < k < \frac{2S_Y}{R + y_Y}$$

$$-R < y_Y < R \qquad (7)$$

$$-R < y_Y < R \qquad (7)$$

Note that parameter k represents the slope of the inclined deformation line within the pipe section, such that r and R are pipe inner and outer radii, respectively.

The resulting structural strain values at pipe extrados ($\varepsilon_o$) and intrados ($\varepsilon_i$) are:

$$\varepsilon_o = [k(R - y_Y) + S_Y]/E$$

$$\varepsilon_i = [-k(R + y_Y) + S_Y]/E \qquad (8A)$$

Figure 8:
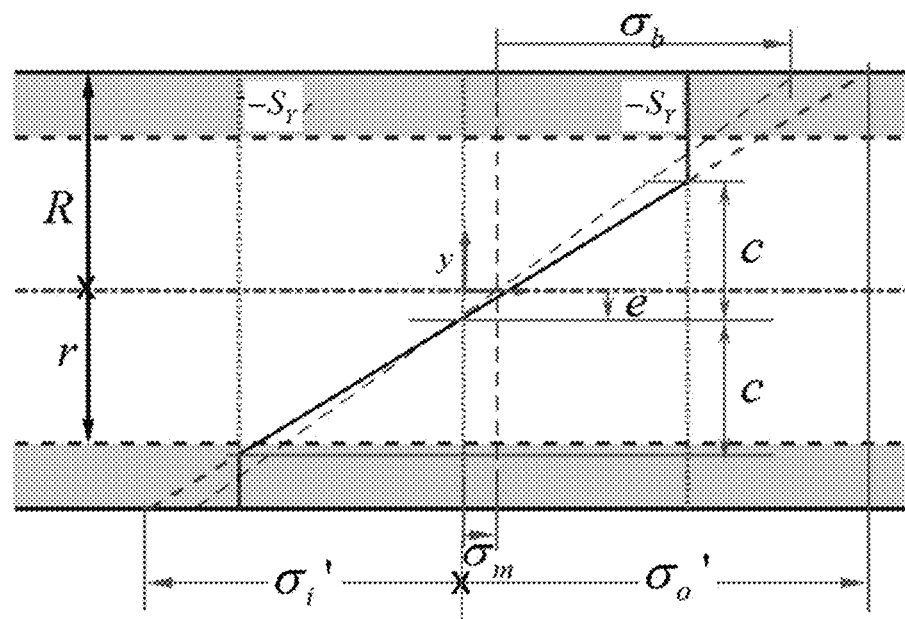
FIG. 8 is a diagram illustrating the structural strain definition and calculation procedure for a pipe section subject to two side yielding conditions.

Under two-side yielding conditions illustrated in FIG. 8, the corresponding pseudo structural stress distribution by scaling structural strain by Young's modulus can be shown as:

$$\sigma(y) = \begin{cases} S_Y & c + e \leq y \leq R \\ \dfrac{S_Y}{c}(y - e) & -c + e \leq y \leq c + e \\ -S_Y & -R \leq y < -c + e \end{cases} \qquad (8)$$

Based on the definitions of e and c from FIG. 8, the following inequalities must hold:

$$e + c < R$$

$$e - c > -R$$

$$c > 0 \qquad (9)$$

The corresponding structural strain values at pipe extrados ($\varepsilon_o$) and intrados ($\varepsilon_i$) are:

$$\varepsilon_o = \frac{\sigma_Y(R - e)}{cE} \qquad (10A)$$

$$\varepsilon_i = \frac{-\sigma_Y(R + e)}{cE}$$

Figure 9:
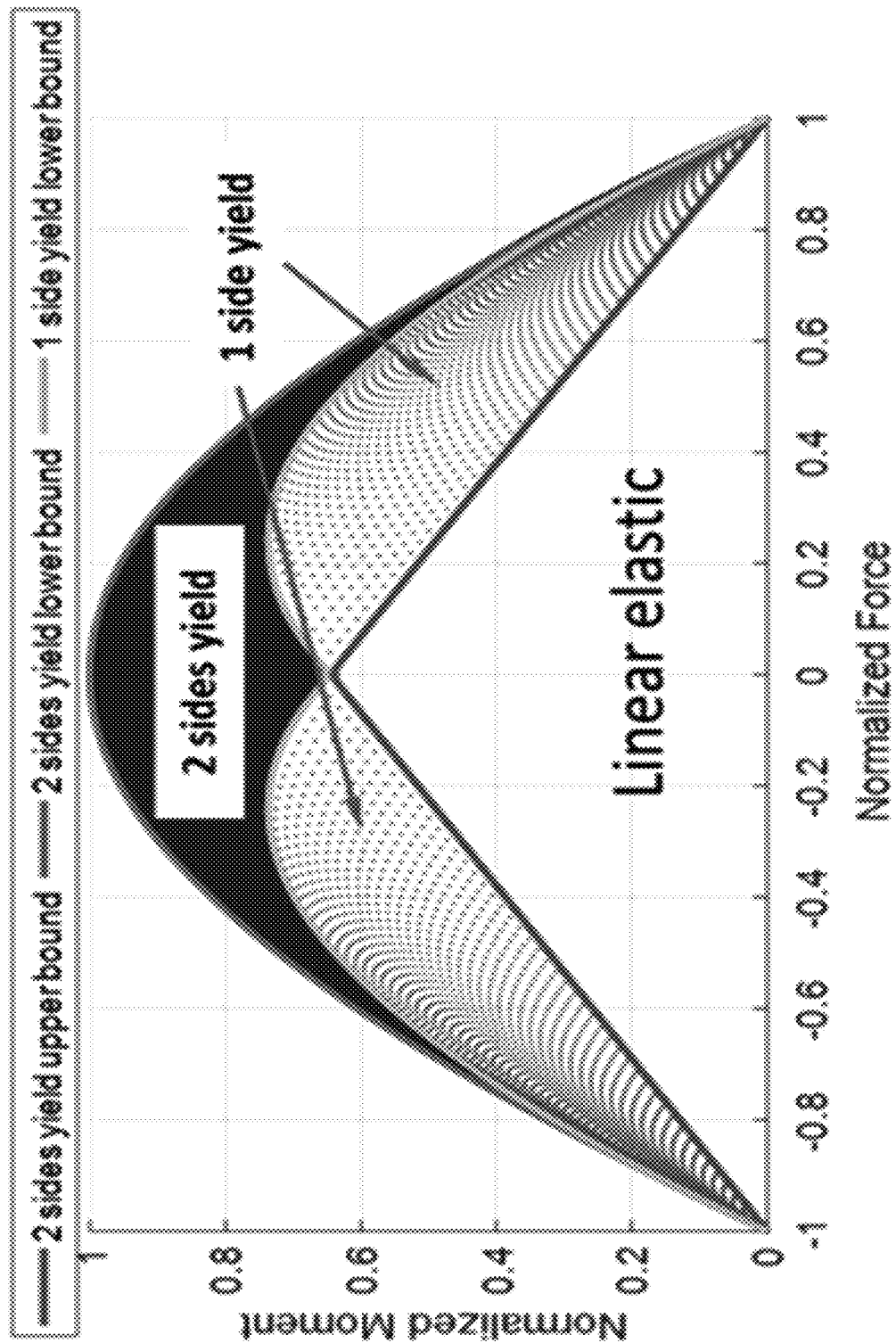
FIG. 9 is a graph showing the solution regime for linear elastic, one-side yielding and two-side yielding for under given elastically calculated structural stresses which can then convert to pipe section force and moments.

FIG. 9 illustrates the two solution regimes. For a given set up remotely applied F and moment M, normalized force F' and moment M' are defined as:

$$F'=F/F_{lim}=\sigma_m/\sigma_Y \quad (11)$$

$$F' = F/F_{lim} = \sigma_m/\sigma_Y \quad (11)$$

$$M' = M/M_{lim} = \frac{3\pi\sigma_b}{16\sigma_Y}\frac{1-(r/R)^4}{1-(r/R)^3} \quad (12)$$

where $F_{lim}$, and $M_{lim}$ follow the classical limit state definitions. For a given application, FIG. 9 is used to determine if one-side or two-side yielding condition prevails. For one-side yielding, k and $y_Y$ in Eq. 6 or two-side yielding, e and c in Eq. (8) can then be solved numerically in satisfying equilibrium conditions. Then, Eqs. (8A and 10A) can be used to calculate the corresponding structural strains.

FIGS. 10A and 10B show that two traction structural stress components can vary over time. Previously, there were no well-accepted multiaxial fatigue life calculation procedures that could be used for performing fatigue design and evaluation of engineering structures subjected to random, and non-proportional multiaxial loading in which two traction structural stress components vary over time independently. As a part of this disclosure, both cycle counting and fatigue damage calculation can be determined more reliably using the methods set forth below.

In the example embodiment, a determination is made at 18 as to whether the given structure is subject to non-proportional multiaxial load condition as seen in FIG. 1. A non-proportional multiaxial load condition exists: if shear stress (parallel to the plane of interest) are not negligible (e.g., larger than ⅓ of normal stress); and if shear stress is not proportional to normal stress over time or the shear and normal stresses are independent of each other. These conditions can be used to determine presence of a non-proportional multiaxial load condition.

When the given structure is not subject to non-proportional multiaxial load condition, the structural strain range is calculated at 19, for example using a Rainflow cycle counting. This cycle counting method is further described by Pingsha Dong et. al in "A path-dependent cycle counting method for variable-amplitude multi-axial loading" International Journal of Fatigue 32.4 (2010): 720-734 which is incorporated by reference in its entirety.

When the given structure is subject to non-proportional multiaxial load condition, the structural strain range is calculated at 20 as a function of a non-proportional damage parameter which accounts for in-plane stress as further described below. In summary, the structural strain range is calculated by representing a non-proportional load path in a piecewise linear form; computing a non-proportional damage parameter by numerically integrating the moment of each linear segment of the piecewise linear form with respect to a reference load path; and calculating the structural strain range as a function of the non-proportional damage parameter. This approach is further described below.

For each cycle or one-half cycle determined with the cycle counting method (e.g., with respect to non-proportional load path $\widetilde{AB}$), a non-proportional fatigue damage parameter $g_{NP}$ is defined in structural strain plane, e.g., $\varepsilon$–$\gamma$ plane as seen in FIG. 11. Note that here E has the same meaning as $\varepsilon_0$ above and that shear structural strain under torsion can be calculated in the same manner as normal structural strain $\varepsilon$ once $\tau_m$ and $\tau_b$ become available through Eq. (2). Then, structural strain range incorporating non-proportional load path induced damage can be written as:

$$\Delta\varepsilon_{NP}=\Delta\varepsilon_{AB}(1+\alpha_\varepsilon \cdot g_{NP}) \quad (13)$$

where $\alpha_\varepsilon$ is a material parameter measuring material sensitivity to load-path non-proportionality and $g_{NP}$ is given in FIG. 11. Note that $\Delta\varepsilon_{AB}$, having the same meaning as $\Delta\varepsilon$ above, signifies strain range corresponding to the proportional load path $\overline{AB}$, i.e., the distance from Position A to B seen in FIG. 11.

Referring to FIG. 12, the structural strain based approach to multiaxial fatigue damage calculation can be framed in terms of pseudo-elastic structural stress based approach in a stress plane, e.g., $\sigma$–$\tau$ plane:

$$\Delta\sigma_{NP}=\Delta\sigma_{AB}(1+\alpha \cdot g_{NP}) \quad (14)$$

where a is a material parameter measuring material sensitivity to load-path non-proportionality, but determined in stress plane. Both $\alpha$ and $\alpha_\varepsilon$ can be determined by comparing simple proportional multiaxial fatigue test data with those obtained under simple non-proportional multiaxial fatigue loading conditions. Note that pseudo-elastic shear structural stress $\tau$ is determined through Hooke's law, i.e., T=G$\gamma$, where G is shear modulus of material.

Actual load or structural stress time histories are typically stored in piecewise linear form. As such, non-proportional load path illustrated in FIG. 12 can be represented in piecewise linear form shown in FIG. 15. Then, $g_{NP}$ expressed as:

$$g_{NP} = \frac{D_{NP}}{D_{reference}} = \frac{\int_{\square_{AB}} r'|\sin(\theta)|ds'}{\int_{\square_{AB}} R|\sin(\theta)|ds'} = \frac{\int_{\square_{AB}} r'|\sin(\theta)|ds'}{2R^2} \quad (15)$$

in FIG. 12 can be calculated as follows with respect to FIG. 13.

$$\sigma_e=\sqrt{(x_n-x_0)^2+(y_n-y_0)^2} \quad (16)$$

$$ds_i=\sqrt{(x_i-x_{i-1})^2+(y_i-y_{i-1})^2} \quad (17)$$

Note that the midpoint between $(x_{j-1}, y_{i-1})$ and $(x_i, y_i)$ is given as $$\left(\frac{x_{i-1}+x_i}{2}, \frac{y_{i-1}+y_i}{2}\right).$$

Then, the distance of the midpoint to reference proportional path $\overline{AB}$ becomes:

$$l_i = \frac{\left|(y_n-y_0)\left(\frac{x_{i-1}+x_i}{2}\right)-(x_n-x_0)\left(\frac{y_{i-1}+y_i}{2}\right)+x_n y_0 - y_n x_0\right|}{\sqrt{(x_n-x_0)^2+(y_n-y_0)^2}} \quad (18)$$

It then follows that:

$$D_{NP}=\Sigma_{i=1}^{i=n} l_i ds_i \quad (19)$$

leading to:

$$D_{NP} = \sum_{i=1}^{i=n} l_i ds_i \quad (19)$$

leading to:

$$g_{NP} = \frac{D_{NP}}{D_{Max}} = \frac{\sum_{i=1}^{i=n} l_i ds_i}{2R^2} = \frac{\sum_{i=1}^{i=n} l_i ds_i}{2\left(\frac{\sigma_e}{2}\right)^2}$$

$$g_{NP} = \frac{2\sum_{i=1}^{i=n}\left(\left|(y_n - y_0)\left(\frac{x_{i-1} + x_i}{2}\right) - (x_n - x_0)\left(\frac{y_{i-1} + y_i}{2}\right) + x_n y_n - y_n x_0\right|\right)\left(\sqrt{(x_i - x_{i-1})^2 + (y_i - y_{i-1})^2}\right)}{\left((x_n - x_0)^2 + (y_n - y_0)^2\right)^{\frac{3}{2}}} \quad (20)$$

With the two parameters, say α and $g_{NP}$ determined as discussed above, fatigue design and life evaluation for complex structures subjected to variable amplitude non-proportional multiaxial loading conditions can be determined by using equivalent pseudo-elastic structural stress parameter:

$$\Delta S_{NP} = \frac{\Delta \sigma_{NP}}{(1-R_L)^{\frac{2}{m}} t^{*\frac{2-m}{2m}} I(r_e)^{\frac{1}{m}}} \quad (21)$$

where $R_L$ represents applied stress ratio which is applicable for stress-relieved conditions and set to be 0 for as-welded conditions and $r_e$ is an effective bending ratio, given below:
Or, in terms of structural strains, $$r_e = \frac{\sqrt{\Delta\sigma_b^2 + \beta\Delta\tau_b^2}}{\sqrt{\Delta\sigma_m^2 + \beta\Delta\tau_m^2} + \sqrt{\Delta\sigma_b^2 + \beta\Delta\tau_b^2}} \quad (22)$$

$$\Delta E_{NP} = \frac{\Delta\varepsilon_{NP}}{(1-R_L)^{\frac{2}{m}} t^{*\frac{2-m}{2m}} I(r'_e)^{\frac{1}{m}}} \quad (23)$$

where, $$r'_e = \frac{\sqrt{\Delta\varepsilon_b^2 + \left(\frac{1}{\beta}\right)\Delta\gamma_b^2}}{\sqrt{\Delta\varepsilon_m^2 + \left(\frac{1}{\beta}\right)\Delta\gamma_m^2} + \sqrt{\Delta\varepsilon_b^2 + \left(\frac{1}{\beta}\right)\Delta\gamma_b^2}} \quad (24)$$

where $\sqrt{1/\beta}$ is a fatigue equivalency parameter which can be obtained by comparing fatigue test data between pure cyclic torsion and tension tests. Note that if fatigue loading is dominantly uniaxial, i.e., shear stress τ or strain γ becomes negligible and effects of applied stress ratio $R_L$ needs not be considered, i.e., as-welded conditions, Eqs. (21) and (22) are reduced to Eqs. (4) and (5).

For fatigue design and life evaluation or test data correlation purposes, Eq. (21) and Eq. (23) are equivalent, depending on analysts' preference to either using stress or using strain. FIGS. 14A and 14B show a comparison of data correlations by comparing existing hot spot stress method according to Eurocode 3 (FIG. 14A) with the newly developed method (say, Eq. 21) (FIG. 14B) for a comprehensive collection of multiaxial fatigue test data from a number of structural components. The effectiveness of Eq. (21) is clearly shown in FIGS. 14A and 14B. The same can be said about FIGS. 15A and 15B in which an International Institute of Welding (IIW) recommended hot spot stress method is compared with the newly developed method.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for calculating structural strain for a structure under load, comprising:
generating a finite element model for a given structure;
calculating a distribution of structural stress within the given structure using the finite element model and while the given structure is under a given load, where the distribution of stress is determined in relation to a plane intersecting the given structure;
calculating a distribution of structural strain experienced within the given structure while the given structure is under the given load, where the distribution of structural strain is calculated in part from the calculated distribution of structural stress and the distribution of structural strain is defined in relation to the plane by two closed-form expressions which account for stress that exceeds yield strength of material comprising the structure; and
calculating a fatigue life for the given structure using a structural strain range, wherein the structural strain range is defined in terms of $$\Delta E_s = \frac{\Delta \varepsilon_{NP}}{t^{\frac{2-m}{2m}} I(r')^{\frac{1}{m}}}$$

where $\Delta\varepsilon_0$ represents uniaxial fatigue loading induced structural strain range for which $\Delta\varepsilon_{NP}=\Delta\Sigma_{AB}(1+\alpha_\epsilon \cdot g_{NP})$ where $\Delta\varepsilon_{AB}=\Delta\varepsilon_0$ and $g_{NP}=0$, leading to $\Delta\varepsilon_{NP}=\Delta\varepsilon_0$, t is material thickness, m is an exponent derived crack growth data, r' is a bending ratio, and I(r') is a dimensionless polynomial function of the bending ratio r'.

2. The method of claim 1 wherein the given structure is defined as a plate and, when strain exceeds yield strain of non-hardening material at one surface of the plate, the distribution of strain is defined at the plate surfaces by $$\varepsilon_o = \frac{S_Y}{E} + k(t - 2c)$$

$$\varepsilon_i = \frac{S_Y}{E} - 2kc$$

where $\varepsilon_0$ is a top surface value, $\varepsilon_i$ is a bottom surface value, $S_Y$ is yield strength of the material, E is Young's modulus of the material, c is elastic core and k is the slope of the inclined deformation line across plate thickness t.

3. The method of claim 1 wherein the given structure is defined as a plate and, when strain exceeds yield strain of material on two surfaces of the plate, the distribution of strain is defined at the plate surfaces by $$\varepsilon_o = k\left(e + \frac{t}{2}\right)$$

$$\varepsilon_i = k\left(e - \frac{t}{2}\right)$$

where $\varepsilon_0$ is a top surface value, $\varepsilon_i$ is a bottom surface value, t is thickness of the plate, E is Young's modulus of the material and k is the slope of the deformation line across plate thickness.

4. The method of claim 1 wherein the given structure is defined as a pipe and, when strain exceeds yield strength of non-hardening material in one side of the plane, the distribution of strain is defined $$\varepsilon_o = [k(R - y_Y) + S_Y]/E$$

$$\varepsilon_i = [k(R - y_Y) + S_Y]/E$$

where $\varepsilon_0$ is an exterior surface value, $\varepsilon_i$ is an interior surface value, R is an outer radii of the pipe, r is an inner radii of the pipe, E is Young's modulus of the material, k is slope of the inclined deformation line with the elastic core, $y_Y$ is distance for plastic deformation boundary to neutral axis and $S_Y$ is yield strength of material.

5. The method of claim 1 wherein the given structure is defined as a pipe and, when strain exceeds yield strength of material on two sides of the plane, the distribution of strain is defined $$\varepsilon_0 = \frac{S_Y(R - e)}{cE}$$

$$\varepsilon_i = \frac{-S_Y(R + e)}{cE}$$

where $\varepsilon_0$ is an exterior surface value, $\varepsilon_i$ is an interior surface value, R is an outer radii of the pipe, E is Young's modulus of the material, c is distance for plastic deformation boundary to neutral axis and $S_Y$ is yield strength of material.

6. The method of claim 5 wherein the distribution of structural strain is determined numerically.

* * * * *

UNITED STATES PATENT AND TRADEMARK OFFICE
CERTIFICATE OF CORRECTION

PATENT NO. : 11,471,982 B2
APPLICATION NO. : 16/055485
DATED : October 18, 2022
INVENTOR(S) : Pingsha Dong et al.

It is certified that error appears in the above-identified patent and that said Letters Patent is hereby corrected as shown below:

On the Title Page

Item (57) Abstract, Line number 2, after "cannot be", delete "calculated".

In the Claims

At Column 15, Claim number 1, Line numbers 38-41, delete "$\Delta E_s = \frac{\Delta \varepsilon_{NP}}{t^{\frac{2-m}{2m}} I(r')^{\frac{1}{m}}}$" and insert --$\Delta E_s = \frac{\Delta \varepsilon_v}{t^{\frac{2-m}{2m}} I(r')^{\frac{1}{m}}}$--.

Signed and Sealed this
Tenth Day of January, 2023

Katherine Kelly Vidal
*Director of the United States Patent and Trademark Office*